United States Patent
Mayer-Wolf et al.

(10) Patent No.: US 10,735,221 B2
(45) Date of Patent: Aug. 4, 2020

(54) FLEXIBLE PROCESSOR OF A PORT EXTENDER DEVICE

(71) Applicant: Marvell World Trade Ltd., St. Michael (BB)

(72) Inventors: Ilan Mayer-Wolf, Tel-Aviv (IL); Ilan Yerushalmi, Hod Hasharon (IL); David Melman, Halutz (IL); Tal Mizrahi, Haifa (IL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/938,995

(22) Filed: Mar. 28, 2018

(65) Prior Publication Data

US 2018/0287819 A1 Oct. 4, 2018

Related U.S. Application Data

(60) Provisional application No. 62/477,887, filed on Mar. 28, 2017.

(51) Int. Cl.
 *H04L 12/28* (2006.01)
 *H04L 12/46* (2006.01)
 (Continued)

(52) U.S. Cl.
 CPC .......... *H04L 12/4645* (2013.01); *H04L 45/00* (2013.01); *H04L 45/50* (2013.01);
 (Continued)

(58) Field of Classification Search
 CPC ..... H04L 12/4645; H04L 45/00; H04L 69/22; H04L 49/3063; H04L 45/7453; H04L 45/50; H04L 49/3009
 (Continued)

(56) References Cited

U.S. PATENT DOCUMENTS 6,304,903 B1 10/2001 Ward
6,665,725 B1 12/2003 Dietz
(Continued)

FOREIGN PATENT DOCUMENTS

WO WO-99/07180 A2 2/1999

OTHER PUBLICATIONS

Shpiner et al., "Reducing the Reordering Delay in Multi-Core Network Processors", Technical Report TR12-01, Comnet, Technion, Israel, Jan. 2012, 12 pages.
(Continued)

*Primary Examiner* — Mang Hang Yeung

(57) ABSTRACT

A packet type corresponding to a packet received by a network device is determined. Based on the packet type, one or more header fields to be extracted from a header of the packet are identified. Identifying the one or more header fields includes extracting, from a memory based on the packet type, respective indicators of locations of the one or more header fields and respective indicators of sizes of the one or more header fields. The one or more identified header fields from the header of the packet, based on the respective indicators of locations of the one or more header fields and respective indicators of sizes of the one or more header fields. The packet is then processed based on the one or more header fields extracted from the header. The processing includes deter mining at least one port to which to forward the packet.

22 Claims, 12 Drawing Sheets

(51) Int. Cl.
*H04L 12/701* (2013.01)
*H04L 12/723* (2013.01)
*H04L 12/743* (2013.01)
*H04L 12/935* (2013.01)
*H04L 29/06* (2006.01)

(52) U.S. Cl.
CPC ...... *H04L 45/7453* (2013.01); *H04L 49/3009* (2013.01); *H04L 49/3063* (2013.01); *H04L 69/22* (2013.01)

(58) Field of Classification Search
USPC .......................................................... 370/392
See application file for complete search history.

(56) References Cited

U.S. PATENT DOCUMENTS

| | | |
|---|---|---|
| 6,741,591 B1 | 5/2004 | Kaldani et al. |
| 7,020,657 B2 | 3/2006 | Rumph |
| 7,046,687 B1 | 5/2006 | Brown et al. |
| 7,212,531 B1 | 5/2007 | Kopelman et al. |
| 7,426,608 B1 | 9/2008 | Kao |
| 7,453,892 B2 | 11/2008 | Buskirk et al. |
| 7,539,195 B2 | 5/2009 | Paatela et al. |
| 7,664,938 B1 | 2/2010 | Tripathi et al. |
| 7,924,860 B1 | 4/2011 | Frailong et al. |
| 7,978,700 B2 | 7/2011 | Kopelman et al. |
| 8,111,690 B2 | 2/2012 | Hussain et al. |
| 8,571,035 B2 | 10/2013 | Kopelman et al. |
| 8,848,715 B2 | 9/2014 | Izenberg et al. |
| 9,455,907 B1 | 9/2016 | Shumsky et al. |
| 9,467,399 B2 | 10/2016 | Wohlgemuth et al. |
| 9,479,620 B2 | 10/2016 | Levy et al. |
| 9,571,380 B2 | 2/2017 | Kadosh et al. |
| 9,729,442 B1 | 8/2017 | Stark et al. |
| 9,923,813 B2 | 3/2018 | Levy et al. |
| 9,954,771 B1 | 4/2018 | Levy et al. |
| 10,009,270 B1 | 6/2018 | Stark et al. |
| 10,033,638 B1 | 7/2018 | Stark et al. |
| 10,230,810 B1 | 3/2019 | Bhide et al. |
| 10,263,919 B1 | 4/2019 | Matthews et al. |
| 2002/0163909 A1 | 11/2002 | Sarkinen et al. |
| 2003/0210702 A1 | 11/2003 | Kendall |
| 2004/0066748 A1 | 4/2004 | Burnett |
| 2004/0090974 A1 | 5/2004 | Balakrishnan et al. |
| 2004/0100950 A1 | 5/2004 | Basu et al. |
| 2005/0141513 A1 | 6/2005 | Oh et al. |
| 2008/0095149 A1 | 4/2008 | Dai |
| 2008/0114887 A1 | 5/2008 | Bryers et al. |
| 2008/0225874 A1 | 9/2008 | Lee |
| 2008/0232374 A1 | 9/2008 | Kopelman |
| 2009/0147683 A1 | 6/2009 | Mustafa |
| 2010/0150158 A1 | 6/2010 | Cathey et al. |
| 2011/0149966 A1 | 6/2011 | Pope et al. |
| 2011/0255540 A1 | 10/2011 | Mizrahi et al. |
| 2011/0274112 A1 | 11/2011 | Czaszar et al. |
| 2012/0002546 A1 | 1/2012 | Sundararaman et al. |
| 2012/0020373 A1 | 1/2012 | Subramanian et al. |
| 2012/0177047 A1 | 7/2012 | Roitshtein |
| 2013/0016725 A1 | 1/2013 | Julien et al. |
| 2014/0169378 A1 | 6/2014 | Shumsky et al. |
| 2014/0177470 A1 | 6/2014 | Roitshtein et al. |
| 2014/0185442 A1 | 7/2014 | Newman et al. |
| 2014/0192815 A1 | 7/2014 | Shumsky et al. |
| 2014/0334488 A1 | 11/2014 | Guichard et al. |
| 2015/0009809 A1 | 1/2015 | Zhang |
| 2015/0016458 A1 | 1/2015 | Patel et al. |
| 2015/0071079 A1 | 3/2015 | Kadosh et al. |
| 2015/0110113 A1* | 4/2015 | Levy ..................... H04L 45/745 370/392 |
| 2015/0113190 A1 | 4/2015 | Wohlgemuth et al. |
| 2015/0172188 A1 | 6/2015 | Levy et al. |
| 2015/0172222 A1* | 6/2015 | Liao ..................... H04L 49/356 370/392 |
| 2015/0277924 A1 | 10/2015 | Zappulla et al. |
| 2016/0173338 A1 | 6/2016 | Wolting |
| 2017/0104732 A1 | 4/2017 | Mundra et al. |
| 2017/0208011 A1 | 7/2017 | Bosch et al. |
| 2017/0339074 A1 | 11/2017 | Melman et al. |
| 2017/0339075 A1 | 11/2017 | Arad |
| 2017/0366467 A1 | 12/2017 | Martin et al. |

OTHER PUBLICATIONS

Chen, "Home Network Basis: Transmission Environments and Wired/Wireless Protocols," Prentice Hall, 26 pages (2006).
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).
IEEE Std 802.1BR-2012 "IEEE Standard for Local and metropolitan area networks—Virtual Bridged Local Area Networks—Bridge Port Extension," The Institute of Electrical and Electronics Engineers, Inc., 135 pages (May 14, 2012).
IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).
IEEE Std 802.1Q™—2014 (Revision of IEEE Std.802.1Q-2011), "IEEE Standard for Local and Metropolitan Area Networks—Bridges and Bridged Networks," *The Institute of Electrical and Electronics Engineers, Inc.*, 1,832 pages (Nov. 3, 2014).
IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).
IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).
Pagiamtzis et al. "Content-Addressable Memory (CAM) Circuits and Architectures: A Tutorial and Survey," IEEE Journal of Solid-State Circuits, vol. 31, No. 3, pp. 712-727 (Mar. 2006).
U.S. Appl. No. 15/969,116, Mayer-Wolf et al., "Flexible Processor of a Port Extender Device," filed May 2, 2018.
International Search Report and Written Opinion in International Patent Application No. PCT/IB2018/052153, dated Jun. 11, 2018 (13 pages).
Office Action in U.S. Appl. No. 15/969,116, dated May 15, 2019 (28 pages).
Notice of Allowance in U.S. Appl. No. 15/969,116, dated Nov. 22, 2019 (10 pages).

* cited by examiner

| Dst Index field #1 | | | Dst Index field #3 | | | Dst Index field #3 | | | Dst Index field #4 | | | Table Partition Fields | |
|---|---|---|---|---|---|---|---|---|---|---|---|---|---|
| Byte Offset 512-1 | Bit Offset 514-1 | Num Bits 516-1 | Byte Offset 512-2 | Bit Offset 514-2 | Num Bits 516-2 | Byte Offset 512-3 | Bit Offset 514-3 | Num Bits 516-3 | Byte Offset 512-4 | Bit Offset 514-4 | Num Bits 516-4 | Dst Indx Constant 518 | Max Dst Indx 520 |

FIG. 5A

| Src Index field #1 | | | Src Index field #3 | | | Src Index field #3 | | | Src Index field #4 | | | Table Partition Fields | |
|---|---|---|---|---|---|---|---|---|---|---|---|---|---|
| Byte Offset 562-1 | Bit Offset 564-1 | Num Bits 566-1 | Byte Offset 562-2 | Bit Offset 564-2 | Num Bits 566-2 | Byte Offset 562-3 | Bit Offset 564-3 | Num Bits 566-3 | Byte Offset 562-4 | Bit Offset 564-4 | Num Bits 566-4 | Src Indx Constant 568 | Max Src Indx 570 |

Source Index field identifiers 561

560, 550

Packet Type Index →

*FIG. 5B*

FLEXIBLE PROCESSOR OF A PORT EXTENDER DEVICE

CROSS-REFERENCES TO RELATED APPLICATIONS

This disclosure claims the benefit of U.S. Provisional Patent Application No. 62/477,887, entitled "Passive Intelligent Port Extender," filed on Mar. 28, 2017, which is hereby incorporated by reference herein in its entirety.

FIELD OF TECHNOLOGY

The present disclosure relates generally to network switching systems, and more particularly to network switching systems that use port extenders.

BACKGROUND

Some networking applications require switching between high numbers of ports. For example, a typical data center includes a large number of servers, and switches configured to communicatively couple the servers to outside network connections, such as backbone network links. As another example, a high-volume website server system (server farm) can include a large number of web servers, and switches to communicatively couple the web servers to backbone network links. More generally, enterprise networks involve large numbers of computers communicatively coupled together via large numbers of network links, which often require switching systems that switch between large numbers of ports.

In such applications, switching systems capable of switching between a large number of ports are utilized. Such switching systems can include a large number of switches, and each switch can be capable of switching between several ports.

Some network switching systems utilize port extenders (PEs) coupled to ports of a controlling bridge (CB) serving as a central switch. Each PE is typically a relatively low complexity device that includes a plurality of ports. When coupled to a port of the CB, the PE serves as a port fan-out for the CB, effectively increasing the number of ports handled by the CB at relatively low cost.

In a typical network switching system employing PEs, a forwarding tag is inserted into a header of a packet ingressing the network switching system, is utilized to forward the packet through the network switching system, and is stripped from the header of the packet when the packet is ultimately egressed from the network switching system. In conventional network switching systems, forwarding tags that conform to a particular format, such as the E-tag format defined by the Institute for Electrical and Electronics Engineers (IEEE) 802.1BR Standard, are utilized.

SUMMARY

In an embodiment, a method for processing of packets ingressing a network device includes receiving a packet at a port of the network device; performing, with an ingress processor of the network device, ingress processing of the packet, the ingress processing including determining a packet type corresponding to the packet; identifying, based on the packet type, one or more header fields to be extracted from a header of the packet, including retrieving, from a memory based on the packet type, i) respective indicators of locations of the one or more header fields and ii) respective indicators of sizes of the one or more header fields; extracting, based on i) the respective indicators of the locations retrieved from the memory and ii) the respective identifiers of the sizes retrieved from the memory, the one or more header fields from the header of the packet; and processing, with a packet processor of the network device, the packet based on the one or more header fields extracted from the header, the processing including determining at least one port to which to forward the packet.

In another embodiment, a network device comprises a plurality of ports configured to receive and to transmit packets; an ingress processor configured to determine a packet type corresponding to a packet received via a port among the plurality of ports, identify, based on the packet type, one or more header fields to be extracted from a header of the packet, the ingress processor being configured to retrieve, from a memory based on the packet type, i) respective indicators of locations of the one or more header fields and ii) respective indicators of sizes of the one or more header fields, and extract, based on i) the respective indicators of the locations retrieved from the memory and ii) the respective identifiers of the sizes retrieved from the memory, the one or more header fields from the header of the packet; and a packet processor configured to process the packet based on the one or more header fields extracted from the header, the packet processor being configured to at least determine at least one port to which to forward the packet.

In yet another embodiment, a method for egress processing packets in a network device includes identifying, with a first stage engine implemented in hardware, a particular set of computer-readable instructions, for a particular packet, the particular set of computer-readable instructions being identified from among a plurality of sets of computer-readable instructions stored in a memory, respective ones of the plurality of sets of computer-readable instructions being for performing different sets of egress processing operations with respect to different packets; and executing, with a second stage processor configured to execute computer-readable instructions stored in the memory, the particular set of computer-readable instructions, identified by the first stage engine, to perform the corresponding set of egress processing with respect to the particular packet.

In still another embodiment, a network device comprises a plurality of ports configured to receive and to transmit packets; a memory configured to store a plurality of sets of computer-readable instructions for modifying packet headers, respective ones of the plurality of sets of computer-readable instructions being for performing different sets of egress processing operations with respect to different packets; and an egress processing engine, including a first stage engine implemented in hardware, the first stage engine configured to identify, for a particular packet, a particular set of computer-readable instructions, from among the plurality of sets of computer-readable instructions stored in the memory, for performing, and a second stage processor configured to execute computer-readable instructions, the second stage processor being configured to execute the particular set of computer-readable instructions, identified by the first stage engine, to perform the corresponding set of egress processing operations with respect to the particular packet.

BRIEF DESCRIPTION OF THE DRAWINGS

FIG. 5A is a diagram of a destination index table utilized with the header parser of FIG. 3, according to an embodiment.

FIG. 5B is a diagram of a source index table utilized with the header parser of FIG. 3, according to an embodiment.

DETAILED DESCRIPTION

Figure 1:
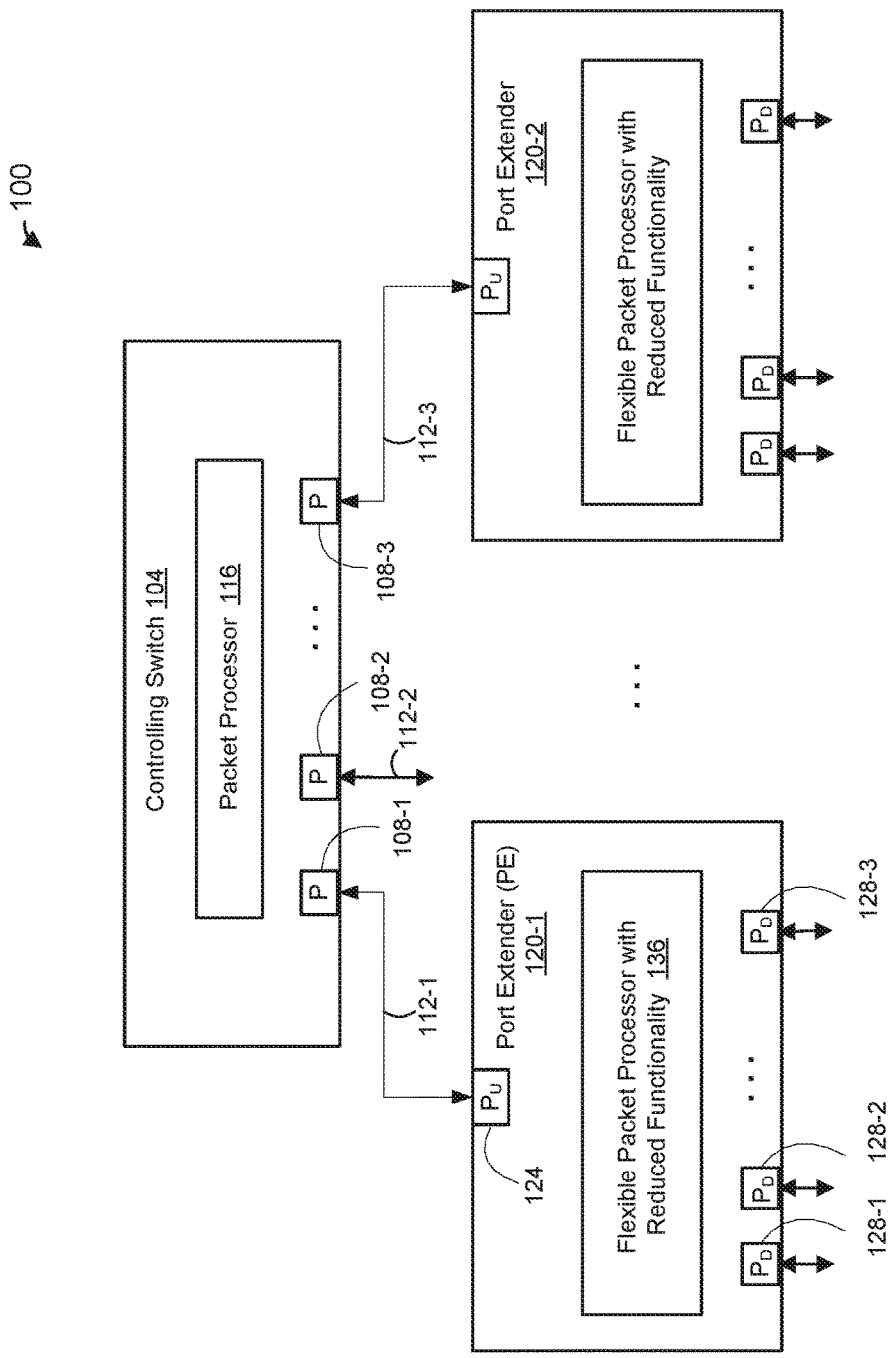
FIG. 1 is a block diagram of an example network switching system configured for processing and forwarding packets, according to an embodiment.

In embodiments described below, a network switching system includes a controlling switch and one or more port extenders (PEs). The controlling switch generally implements full functionality supported by the network switching system, including making bridging and/or routing decisions for forwarding packets toward destination devices external to the network switching system. The one or more PEs, on the other hand, are relatively low complexity devices that implement reduced functionality as compared to the controlling switch. For example, a PE is not configured make bridging and/or routing decisions, in an embodiment. Rather, a PE is configured to merely determine, based on a forwarding tag included in a header of a packet, one or more ports local to the PE to which to forward the packet, and to simply egress the packet via the one or more local ports, in an embodiment.

A standard PE is configured to operate according to a single specific port extender protocol, such as the IEEE 802.1BR Standard. For example, such PE is configured to operate with forwarding tags, such as IEEE 802.1BR E-tags, that conform to the single specific port extender protocol. Such PE is configured, for example, to insert into headers of packets a forwarding tag that conforms to only the single specific port extender protocol, to strip from headers of packets a forwarding tag that conforms to only the single specific port extender protocol, to extract source and destination identifiers from only predetermined locations and of predetermined sizes as specified by the single specific port extender protocol. Such standard PE cannot operate with controlling switches that operate according to non-standard protocols or different controlling switches that operate according to different port extender protocols.

In embodiments described below, however, a PE is customizable to support forwarding according to generic or non-standard protocols and/or according to multiple protocols. For example, in an embodiment, a PE includes a flexible ingress processor, including a configurable header parser to extract relevant fields from the header of different packets, such as source and destination identifier fields from non-standard locations and of non-standard sizes from forwarding tags that conform to non-standard (e.g., custom) port extender protocols or from different forwarding tags that conform to respective ones of multiple port extender protocols. Moreover, in an embodiment, the flexible ingress processor is configured and/or configurable to extract information from different relevant header fields in different packets, depending on packet types determined for the packets. As another example, in an embodiment, a PE includes a flexible egress processor, including a header alteration engine that is programmable to insert into headers of packets, and to strip from header of packets, forwarding tags that conform to non-standard (e.g., custom) port extender protocols or different forwarding tags that conform to respective ones of multiple port extender protocols. The flexible egress processor employs various hardware components that accelerate typically slower software-driven processing operations, allowing the egress processor to perform programmable egress processing operations, such as header alteration operations, at full-wire speed, in an embodiment. These and other techniques described herein allow, for example, a PE to be easily customized to integrate with central switches that operate according to different port extender protocols, including, for example, custom and proprietary port extender protocols, while still operating at full-wire speed, in various embodiments.

FIG. 1 is a block diagram of an example network switching system 100 configured for processing and forwarding data units, i.e., packets, according to an embodiment. The switching system 100 includes a controlling switch 104 having a plurality of ports 108 coupled to respective network links 112. The controlling switch 104 includes a packet processor 116, which processes packets ingressing the controlling switch 104 via the ports 108. In an embodiment, the packet processor 116 implements full switching functionality that the switching system 100 is configured to provide, including making forwarding decisions to forward packets to its own ports 108 as well the ports of other devices (e.g., PE devices) in the switching system 100, for ultimate egress of the packets from the switching system 100. In an embodiment, the packet processor 116 comprises a forwarding engine such as an L2 bridge engine, an L3 router, etc., configured to make the forwarding decisions. Other functions performed by the packet processor 116 include one or more of, determining whether a packet should be trapped or mirrored to another processor (not shown) for further analysis, determining whether a packet should be discarded, metering, policing, etc.

The network switching system 100 also includes one or more PEs 120 communicatively coupled to ports 108 of the controlling switch 104. Although two PEs 120 are illustrated in FIG. 1, the switching system 100 includes other suitable numbers (e.g., 1, 3, 4, 5, 6, etc.) of PEs 120 in other embodiments. Each of the PEs 120 has a structure the same as, or similar to, the PE 120-1, and thus all of the PEs 120 are not described in detail for illustrative purposes.

The PE 120-1 includes a plurality of ports including an upstream port 124 and a plurality of downstream ports 128. The upstream port 124 is for coupling the PE 120-1 to a port of an upstream device (e.g., a port of the controlling switch 104 or an upstream PE device) in the switching system 100. The downstream ports 128 are for coupling to downstream devices (e.g., downstream PE devices) in the switching system 100 or to devices (e.g., end devices) outside of the switching system 100. The PE 120-1 effectively fans-out a port of an upstream device coupled to the upstream port 124 of the PE 120-1 to a number of ports corresponding to the number of downstream ports 128 of the PE 120-1, in an embodiment. As just an example, the PE 120-1 includes a single upstream port 124 and 17 downstream ports 128, in an embodiment. In this embodiment, PE 120-1 effectively fans-out a single port of an upstream device (e.g., the controlling switch 104) to 17 downstream ports. In other embodiments, the PE 120-1 includes other suitable numbers of downstream ports, and the PE 120-1 fans-out a single port of an upstream device (e.g., the controlling switch 104) to the other suitable numbers of downstream ports.

The upstream port 124 is coupled to a port 108 of the controlling switch 104, in the illustrated embodiment. Although the upstream port 124 of the PE 120-1 is shown in FIG. 1 as coupled directly to a port 108 of the controlling switch 104, the upstream port of the PE 120-1 is coupled to the port 108 via a chain of one or more other PEs 120, in some embodiments. Further, although only one upstream port 124 is illustrated in FIG. 1, in other embodiments the PE 120-1 includes multiple upstream ports 124. For example, different upstream ports 124 are respectively coupled to different network devices in the network switching system 100 (e.g., a first uplink port 124 is coupled to the controlling switch 104, and a second uplink port 124 is coupled to a downlink port of another PE 120; or a first uplink port 124 is coupled to a downlink port of a first other PE 120, and a second uplink port 124 is coupled to a downlink port of a second other PE 120; etc.), according to an embodiment. As another example, multiple upstream ports 124 are respectively coupled to different ports 108 of the controlling switch 104, according to an embodiment. The multiple upstream ports 124 are organized as a link aggregate group (LAG) (e.g., an upstream LAG) or trunk (e.g., an upstream trunk), according to some embodiments. When the PE 120-1 decides to forward a packet to the upstream LAG or trunk, a particular one of the upstream ports 124 in the upstream LAG or trunk may be selected based on load balancing, for example. The downstream ports 128 are for communicatively coupling to i) network links that interface with devices external to the network switching system 100, or ii) an upstream port 124 of another PE.

The PE 120-1 includes a packet processor 136, which processes packets ingressing the PE 120-1 via the upstream port 124 and the downstream ports 108. In an embodiment, the packet processor 136 does not implement full switching functionality that the switching system 100, or the packet processor 116 of the controlling switch 104, are configured to provide. For example, the packet processor 136 implements reduced functionality to minimally process packets, merely to determine ports 124, 128 via which to transmit the packets, in an embodiment. Prior to transmitting the packets, the packet processor 136 performs egress processing operations, such as header alteration operations, with respect to at least some of the packets, for example to insert a forwarding tag into a header of a packet or to remove a forwarding tag from a header of a packet, in an embodiment. The packet processor 136, however, does not perform bridging or routing of a packet, or functions of determining whether a packet should be trapped or mirrored to another processor for further analysis, determining whether a packet should be discarded, metering, policing, etc., in some embodiments. Rather, the switching system 100 relies on the packet processor 116 of the controlling switch 104 for bridging and/or routing of the packet, determining whether the packet should be trapped or mirrored to another processor (not shown) for further analysis, determining whether a packet should be discarded, metering, policing, etc., in an embodiment.

In an embodiment, the controlling switch 104 and the PEs 120 forward packets through the switching system 100 using forwarding tags. A forwarding tag is included in, or appended to, a header of the packet by a source PE 120, and is removed from the packet by a target PE 120 before or as the packet egresses the network switching system 100. The forwarding tag includes information that can be used by the controlling switch 104 and/or PEs 120 to forward a packet through the network switching system 100. In one embodiment, the forwarding tag includes indications of one or more of i) a source PE 120 that first received the packet, ii) a target PE 120 to which the packet is to be forwarded, iii) a source external-facing port 128 at which the packet was first received, iv) one or more target external-facing ports 128 of the target PE 120 that is to egress the packet from the network switching system 100, etc. In other embodiments, the forwarding tag additionally or alternatively includes other suitable information that assists forwarding the packet through the network switching system 100.

In an embodiment, the packet processor 136 of the PE 120-1 is configured to parse headers of packet, including headers that conform to different protocols and include forwarding tags of different formats, to extract information for forwarding and/or otherwise processing the packets. The packet processor 136 operates by classifying a packet to a particular packet type, and identifying specific fields within the header of the packet based on the packet type. In an embodiment, the packet processor 136 is configured to classify a packet to a particular packet type based on i) initial information extracted from a header of the packet and ii) information obtained other than form the header of the packet, such as, for example, an indication of and/or a profile of a port at which the packet was received by the PE 120-1. In an embodiment, identifying the specific fields to be extracted from a header of a packet includes determining locations and sizes of the specific fields within the header of the packet based on the packet type. For example, in an embodiment, based on a packet type index generated for a packet, the packet processor 136 accesses a memory to retrieve indications of the locations and the sizes of the specific fields to be extracted from the header of the packet. The packet processor 136 then extracts the identified specific fields, and forwards and/or otherwise processes the packet based on the specific extracted fields. Because the packet processor 136 identifies specific fields in a header of a packet based on a packet type corresponding to the packet, the packet processor 136 is able to extract information, such as forwarding information, from header fields or subfields at varying locations and of varying sizes. As a result, the packet processor 136 can, for example, operate with forwarding tags of different formats, the different formats having forwarding information (e.g., destination identifier (ID), source ID, etc.) of different sizes and/or at different locations within the forwarding tags, in an embodiment.

The packet processor 136 includes an egress processor configured perform egress processing operations, such as header modification operations, in some embodiments. In an embodiment, the egress processor includes one or more processing nodes coupled to a program memory storing computer-readable instructions. The memory stores a plurality of sets of computer-readable instructions, respective sets of computer-readable instructions being for performing different sets of header modification operations, in an embodiment. For example, a first set of computer-readable instructions stored in the program memory is for inserting a forwarding tag into a header of a packet, a second set of computer-readable instructions stored in the program memory is for removing a forwarding tag from a header of a packet, a third set of computer-readable instructions stored in the program memory is for removing a forwarding tag and setting an explicit congestion notification (ECN) mark in a header of a packet, etc., in an embodiment. In an embodiment, to speed up header modification process relative to a purely software-driven header modification implementation, the packet processor 136 implements some portions of the header modification process in hardware. For example, the packet processor 136 utilizes a hardware engine to identify the particular set of computer-readable instructions to be executed for a particular packet, and then executes the identified set of computer-readable instructions to perform the corresponding set of header modifications. Identifying the particular set of computer-readable instructions in hardware reduces or eliminates relatively slower branching operations that would otherwise be implemented via computer-readable instructions to identify a particular set of computer-readable instructions to be executed for a particular packet, in an embodiment. Additionally, in some embodiments, during execution of the identified set of computer-readable instructions, the egress processor engages one or more hardware accelerator engines to perform some operations that would take significantly longer to be performed in a purely software-driven implementation, in an embodiment. These and other techniques described herein allow the egress processor to be programmed (and, when necessary, reprogrammed) to perform different sets of header modifications on different packets while still operating at wire speed, in at least some embodiments.

In an embodiment, the packet processor 116 of the controlling switch 104 and/or the packet processor 136 of the PE 120-1 uses a pipeline architecture. For example, the packet processor 116 includes a full functionality packet processing pipeline while the packet processor 136 includes a reduced functionality packet processing pipeline, according to an embodiment. In other embodiments, however, the packet processor 116 of the controlling switch 104 and/or the packet processor 136 of the PE 120-1 additionally or alternatively uses a parallel processing architecture in which multiple processors execute machine readable instructions (stored in one or more memory devices coupled to the multiple processors) to process multiple packets in parallel.

Figure 2:
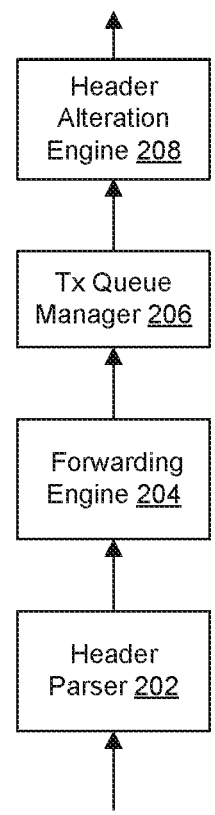
FIG. 2 is a block diagram of a packet processor configured to perform flexible ingress and egress processing of packets, according to an embodiment.

FIG. 2 is a block diagram of a packet processor 200 configured to perform flexible ingress and egress processing of packets, according to an embodiment. The packet processor 200 corresponds to the packet processor 136 of the PE 120-1 of FIG. 1, according to an embodiment. In other embodiments, the packet processor 200 is utilized with a network device (e.g., a PE device) different from the PE 120-1. Similarly, the PE 120-1 utilizes a packet processor different from the packet processor 200, in some embodiments. The packet processor 200 uses a pipeline architecture having a plurality of units coupled together in series, in the illustrated embodiment. In other embodiments, however, the packet processor 200 additionally or alternatively uses a parallel processing architecture in which multiple processors execute machine readable instructions (stored in one or more memory devices coupled to the multiple processors) to process multiple packets in parallel.

A header parser 202 is configured to parse a header of a packet to extract information to be used by the packet processor 200 for forwarding and, in some cases, otherwise processing the packet. Although the header parser 202 is illustrated in FIG. 2 as a separate processing unit, the header parser 202 is included in (i.e., is a part of) an ingress processor configured to perform other ingress processing operations in addition to header parsing operations, in some embodiments. In an embodiment, the header parser 202 is configured classify a packet to a particular packet type, and to identify specific fields to be extracted from the header of the packet based on the packet type. In an embodiment, the header parser 202 is configured to access, based on the packet type, a memory (not shown) coupled to the header parser 202 (e.g., one or more index tables stored in the memory) to identify one or more fields to be extracted from the header of the packet, and to retrieve, from the memory, indications of respective locations and sizes of the one or more fields to be extracted from the header of the packet. The header parser 202 then extracts the identified fields from the indicated locations and of the indicated sizes in the header of the packet, in an embodiment.

In some embodiments, the header parser 202 (or another processing unit of an ingress processor of which the header parser 202 is a part) is configured to concatenate respective one or more sets of the extracted fields to generate one or more forwarding indices, such as a destination index to be used for determining one or more ports to which to forward the packet and a source index to be used for source port filtering. In an embodiment, the one or more index tables stored in the memory further specify respective sets of fields to be concatenated, and an order in which the fields are to be concatenated.

In some embodiments, the header parser 202 is configured to generate a packet descriptor corresponding to the packet. In another embodiment, a suitable processing unit other than the header parser 202 is configured to generate a packet descriptor corresponding to the packet. The header parser 202 is configured to include, in the packet descriptor, the one or more fields extracted from the header of the packet and/or the one or more forwarding indices generated for the packet, in an embodiment. In some embodiments, the packet descriptor is generated to include other information as well such as an indicator of where the packet is stored in a memory coupled to the packet processor 200. The packet processor 200 is configured to further process a packet using a packet descriptor associated with the packet rather than processing the packet itself, in some embodiments. For ease of explanation, the term "packet" herein is used to refer to a packet itself or to a packet descriptor associated with the packet.

A forwarding engine 204 is coupled to the header parser 202. The forwarding engine 204 is configured to utilize information extracted from headers of packets to determine ports of the PE 120-1 to which to forward the packets. In an embodiment, the forwarding engine 204 is configured to utilize the one or more forwarding indices generated by the header parser 202 to access one or more portmaps stored in a memory (not shown) coupled to the forwarding engine 204, the one or more portmaps for selecting ports to which to forward the packets. For example, the forwarding engine 210 is configured to, based on information extracted from a header of a packet, generate a portmap indicating to which one or more ports the packet is to be forwarded, in an embodiment.

A transmit (Tx) queue manager 206 is coupled to the forwarding engine 204. The transmit queue manager 206 generally queues packets in queues corresponding to ports to which the packets are to be forwarded. In an embodiment, the Tx queue manager 206 queues the packets in a plurality of queues corresponding to different physical ports and/or different classes of flows, for example. In an embodiment, the Tx queue manager 206 is configured to utilize information extracted from a header of a packet by the header parser 202 to determine a class of flow of a packet and to select, based on the class of flow, a particular queue into which to place the packet.

A header alteration engine 208 is coupled to the Tx queue manager 206. The header alteration engine 208 is configured to modify headers of at least some packets prior to transmission of the packets. Header alteration operations includes, for example, adding a forwarding tag to a header of a packet, removing a forwarding tag from a header of a packet, updating a forwarding tag in a header of a packet, setting an explicit congestion notification (ECN) mark in a header of a packet, setting a channelized flow control indication in a header of a packet, inserting or updating a timestamp in a header of a packet, updating a transparent clock correction field in a header of a packet, etc. Although the header alteration engine 208 is illustrated in FIG. 2 as a separate processing unit, the header alteration engine 208 is included in (i.e., is a part of) an egress processor configured to perform other egress processing operations in addition to header alteration operations, in some embodiments. In an embodiment, the header alteration engine 208, or the egress processor of which the header alteration engine 208 is a part, includes a programmable engine, i.e., a software-driven processor configured to execute computer-readable instructions stored in a memory. Additionally, the header alteration engine 208, or the egress processor of which the header alteration engine 208 is a part, includes a hardware engine configured to identify a particular set of instructions to be executed to perform a corresponding set of egress processing operations with respect to a packet. In an embodiment, the hardware engine identifies a particular set of computer-readable instructions by performing a memory lookup to retrieve an identifier of (e.g., a pointer to) a location in the program memory at which the particular set of instructions is stored. The identifier is provided to the software-driven processor, in an embodiment. The software-driven processor then executes the identified set of instructions to perform the corresponding set of egress processing operation with respect to the packet. Using a hardware engine to identify the particular set of instructions to be executed to, for example, modify a header of a packet by the software-driven processor eliminate at least some branching decisions that would otherwise be performed in software to identify the particular set of computer-readable instructions (e.g., a particular branch of computer-readable instructions) that should be executed for a particular packet, in at least some embodiments. As a result, the header alteration engine 208, or the egress processor of which the header alteration engine 208 is a part, combines flexibility provided by programmability of egress processing operations with the ability to quickly perform particular egress processing operations with respect to various packets, enabling flexible egress processing of packets to be performed at full-wire speed, in at least some embodiments.

The pipeline of the packet processor 200 illustrated in FIG. 2 is merely an illustrative example. In other embodiments, a suitable packet processing pipeline includes additional and/or alternative pipeline engines/units. For example, additional pipeline engines/units are included between engines/units illustrated in FIG. 2, one or more engines/units illustrated in FIG. 2 are omitted, and/or the order of two or more engines/units illustrated in FIG. 2 is changed. For example, in some embodiments, the respective locations of the TX queue manager 206 and the header alteration engine 208 in the pipeline of the packet processor 200 is reversed relative to the order depicted in FIG. 2.

Figure 3:
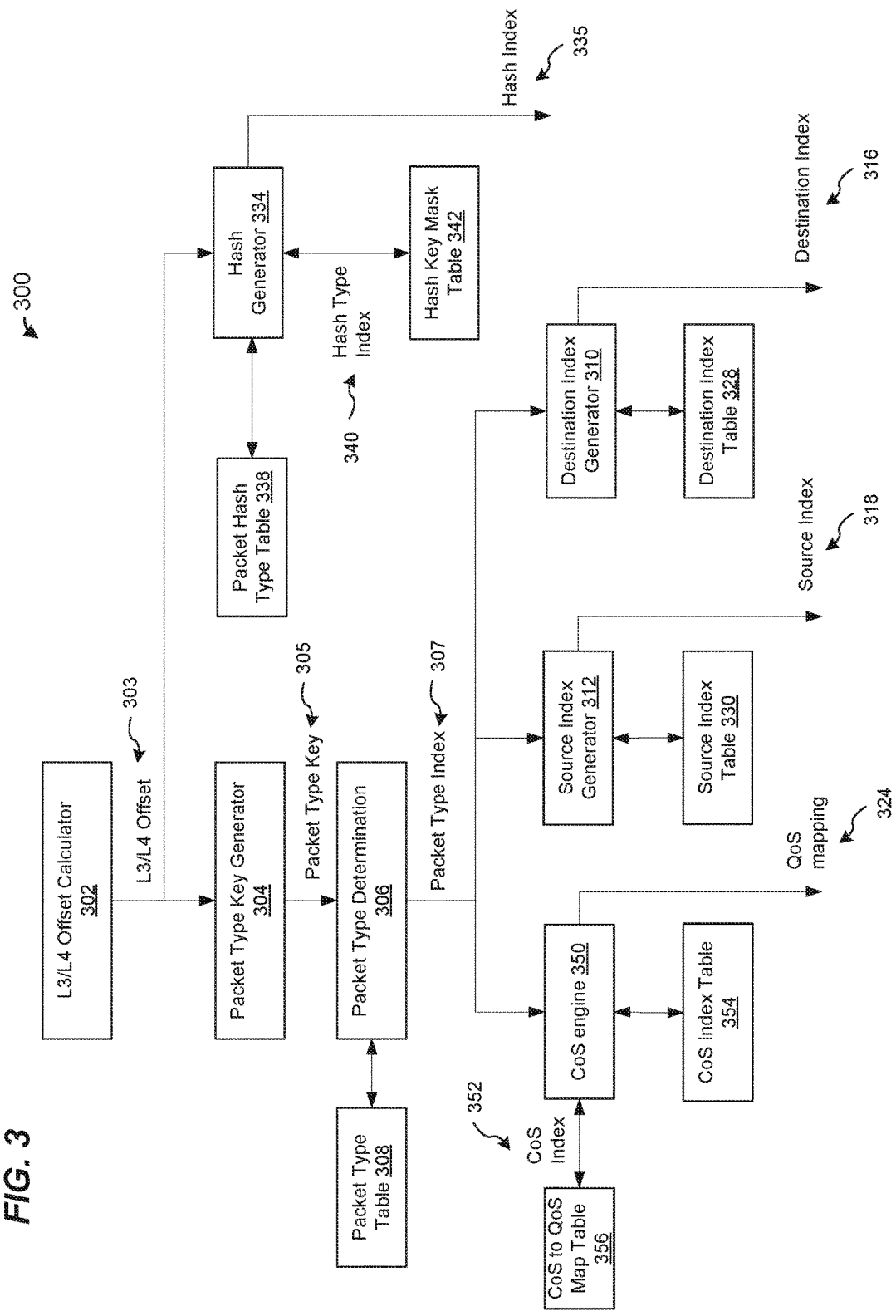
FIG. 3 is a block diagram of a header parser utilized with the packet processor of FIG. 2, according to an embodiment.

FIG. 3 is a block diagram of header parser 300, according to an embodiment. In an embodiment, the header parser 300 corresponds to the header parser 202 of the packet processor 200 of FIG. 2. In other embodiments, however, the header parser 300 is used with suitable packet processors different from the packet processor 200 of FIG. 2. Similarly, the header parser 202 of the packet processor 200 of FIG. 2 is different from the header parser 300, in some embodiments. In some embodiments, the header parser 300 is included in (i.e., is a part of) an ingress processor configured to perform other ingress processing operations in addition to header parsing operations.

The header parser 300 includes an L3/L4 offset calculator 302. The L3/L4 offset calculator 302 is configured to parse over a header of a packet, for example to determine a number of and/or respective sizes of one or more L2 tags included in the header of the packet, a size of an L3 header included in the header of the packet, etc. Based on parsing over the header of the packet, the L3/L4 offset calculator 302 calculates an L3/L4 offset 303 that indicates an L3 offset corresponding to a location of a beginning of an L3 header within the header of the packet (e.g., the number of bits or bytes that the start of L3 header is located from the beginning of a packet header or from some other predetermined anchor within the packet header) and/or an L4 offset corresponding to a location of a beginning of an L4 header within the header of the packet (e.g., the number of bits or bytes that the start of L4 header is located from the beginning of the packet header or from some other predetermined anchor within the packet header). In an embodiment, the L3/L4 offset calculator 302 is configured to parse over one or more L2 tags included in an initial portion of a header of a packet to determine an offset corresponding to a beginning location of an L3 header within the header of the packet. The L3/L4 offset calculator 302 is configured to parse over up to four tags within the header of the packet to determine the L3 offset, in an embodiment. In another embodiment, the L3/L4 offset calculator 302 is configured to parse over another suitable number of tags to determine the L3 offset. The L3/L4 offset calculator 302 is configured to identify each tag (e.g., an 802.1Q tag, an 802.1BR tag, a distributed system architecture (DSA) tag, a proprietary tag, etc.), and to determine a size (e.g., number of bytes, number of bits, etc.) of each tag by analyzing a tag protocol identifier (TPID) field included in the tag, in an embodiment. Based on analyzing a TPID in a tag, the L3/L4 offset calculator 302 determines a size (e.g., number of bytes, number of bits, etc.) of the tag, which varies from 2 bytes to 24 bytes, for example, in various embodiments. Based on the number of tags found in a header of a packet, and the determined sizes of the tags, the L3/L4 offset calculator 302 determines the L3 offset, in an embodiment. The L3/L4 offset calculator 302 determines the L4 offset (e.g., from a beginning of the header or from a beginning of the L3 header), for example by determining, based on analyzing an EtherType field within the header of the packet, whether the packet includes an IPv4 header or an IPv6 header and/or whether the header includes one or more extension fields, such as one or more IPv6 extension headers.

A packet type key generator 304 is coupled to the L3/L4 offset calculator 302. The packet type generator 304 is configured to generate a packet type key 305 corresponding to a packet. In an embodiment, the packet type key generator 304 is configured to generate the packet type key 305 to include information obtained from one or more fields in the header of the packet, such as initial information extracted from L2, L3 and/or L4 header within a header of the packet. In an embodiment, the initial information extracted from L2, L3 and/or L4 header within the header of the packet is indicative of a destination of the packet, a flow to which the packet belongs, an EtherType of the packet, whether the packet is a virtual local area network (VLAN) tagged packet, etc., in various embodiments. In some embodiments, the packet type key generator 304 is configured to generate the packet type key 305 to additionally include information obtained from other than the header of the packet, such as an identifier of and/or port profile corresponding to the port via which the packet was received by the network device (e.g., PE 120-1). In some embodiments, the packet type key 305 is configurable and/or customizable. For example, the packet type key generator 304 generates the packet type key 305 to include user-specified information, such as one or more user-defined byte fields obtained from user-specified locations in the header of the packet, in some embodiments.

Figure 4:
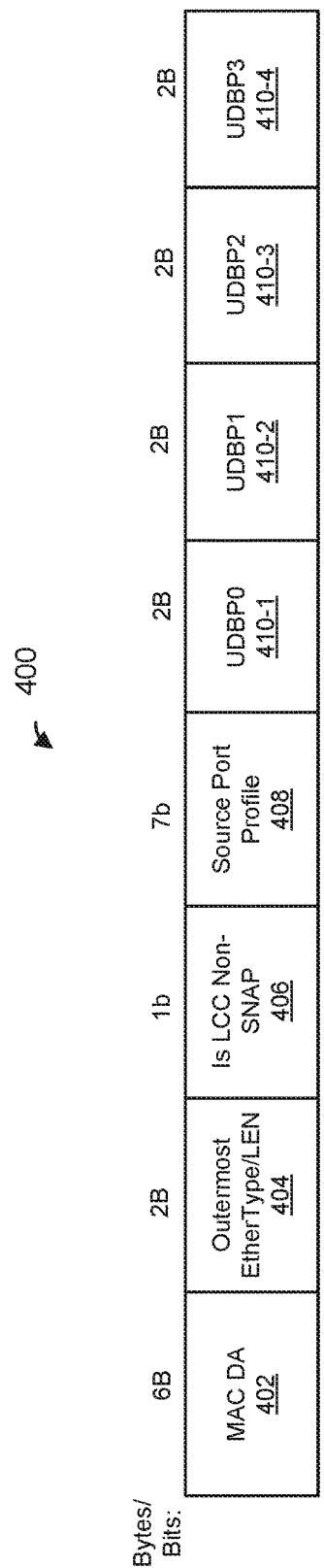
FIG. 4 is a diagram of a packet type key generated by the header parser of FIG. 3, according to an embodiment.

Referring briefly to FIG. 4, a packet type key 400 corresponds to the packet type key 305 generated by the packet type key generator 304, according to an embodiment. The packet type key 400 includes a plurality of fields, including a media access control (MAC) destination address (DA) field 402, an outermost EtherType/length (LEN) field 404, an LLC Non-SNAP field 406, a source profile field 408 and user-defined byte pair (UDBP) fields 410. FIG. 4 includes example numbers of bytes or bits of the various fields (with capital B signifying bytes and non-capital b signifying bits). In other embodiments, different suitable numbers of bytes/bits are utilized. In some embodiments, one or more of the fields illustrated in FIG. 4 are omitted, and/or one or more additional fields are included.

The MAC DA field 402 includes a MAC destination address obtained from the header of the packet. An outermost EtherType/LEN field 404 includes EtherType/Size indication obtained from the header of the packet. The is LLC Non-SNAP field 406 indicates whether or not the packet is a logical link control (LLC) subnetwork access protocol (SNAP) packet. The source port profile field 408 includes a source profile associated with the source port at which the packet was received by the user device. The UDBP fields 410 include user-specified information. For example, each of the UDBP fields 410 includes user-specified initial information extracted from the header of the packet, such as initial information extracted from user-specified locations within the header of the packet, and/or additional user-specified information obtained from other than the header of the packet, in various embodiments. Although the packet type key 400 includes four UDBP fields 410, the packet type key 400 includes other suitable numbers (e.g., 1, 2, 3, 5, 6, etc.) of UDBP fields 410 in other embodiments. In some embodiments, the packet type key 400 does not include any USDB fields.

Referring back to FIG. 3, a packet type determination engine 306 is coupled to the packet type key generator 304. The packet type determination engine 306 is configured to determine a packet type corresponding to a packet based on the packet type key 305 generated for the packet by the packet type key generator 304. In an embodiment, the packet type determination engine 306 is coupled to a packet type table 308. The packet type table 308 is implemented in a content-addressable memory (CAM), such as a binary CAM or a ternary CAM (TCAM), for example. In another embodiment, the packet type table 308 is implemented in a suitable memory other than a CAM. The packet type table 308 includes a plurality of entries respectively corresponding to different packet types. In an embodiment, the packet type table 308 includes 32 entries respectively corresponding to 32 different packet types. In other embodiments, however, the packet type table 308 includes other suitable numbers of entries respectively corresponding to other suitable numbers different packet types. In an embodiment, the packet types correspond to packets having one or more of the following attributes: an Ethernet-IPv4 packet, an Ethernet-IPv6 packet, a VLAN-tagged packet, a unicast E-tagged packet, a multicast E-tagged packet, a unicast DSA-tagged packet, a multicast DSA-tagged packet, and so on, in an embodiment.

The packet type determination engine 306 is configured to search the packet type table 308 to find an entry that matches the packet type key 305, in an embodiment. Upon finding a match (e.g., a first match or a best match) in the packet type table 308, the packet type determination engine 306 determines a packet type index 307, in an embodiment. For example, the packet type index 307 corresponds to the index of the matching entry in the packet type table 308, in an embodiment. In an embodiment, prior to searching the packet type table 308, the packet type determination engine 306 applies a mask to the packet type key 305 to mask one or more bits in the packet type key 305 generated by the packet type key generator 304, and searches the packet type table 308 to find an entry that matches the masked packet type key. In an embodiment, a size of the mask corresponds to the size of the packet type key 305 generated by the packet type key generator 304, and each bit in the mask determines whether and how a corresponding bit in the packet type key 305 will be masked (e.g., unchanged, replaced with a zero, replaced with a "don't care" indicator, replaced with another predetermined value, etc.).

The packet type determination engine 306 provides the packet type index 307 to a destination index generator 310 and a source index generator 312, in an embodiment. The destination index generator 310 is configured generate a destination index 316 to include one or more fields extracted from a header of the packet, in an embodiment. Similarly, the source index generator 312 is configured to generate a source index 318 to include one or more fields extracted from a header of the packet, in an embodiment. The destination index 316 and the source index 318 are provided to a forwarding engine (e.g., the forwarding engine 210 of FIG. 2) to be used for determination of a port or ports to which to the corresponding packet is to be forwarded for subsequent transmission of the packet, in an embodiment.

In an embodiment, the destination index generator 310 is configured to determine, based on the packet type index 307, respective locations and sizes of the one or specific header fields to be included in the destination index 316. In an embodiment, the destination index generator 310 is coupled to a destination index table 328, and the destination index generator 310 is configured to obtain, from the destination index table 328, respective locations and sizes of the one or specific header fields to be included in the destination index 316. Referring to briefly FIG. 5A, a destination index table 500 corresponds to the destination index table 328, in an embodiment. The destination index table 500 includes a plurality of entries 510 indexed by the packet type index. Each entry 510 identifies one or more specific header fields, within a header of a packet of the corresponding packet type, to be included in a destination index for the packet. As an example, a destination index field identifier 511 identifies a destination ID field (e.g., a field indicating a port or a group of ports, such as a multicast group of ports, to which the corresponding packet is to be forwarded) in a forwarding tag in a header of a packet, and specifies a location and a size of the destination ID field for the packet type corresponding for the packet. Thus, the location and/or the size of the destination ID field can be different in different packets, for example in packets having forwarding tags of different formats, in embodiments.

In an embodiment, an entry 510 includes destination index field identifiers 511, each destination index field identifier 511 including a byte offset indicator 512, a bit offset indicator 514 and a number of bits indicator 516. The byte offset indicator 512 and the bit offset indicator 514 together specify a location at which the corresponding field begins in the header of the packet, and the number of bits indicator 516 specifies a size of the field. More specifically, the byte offset indicator 512 specifies a byte offset (e.g., from a beginning of the packet or from another suitable anchor, such as a beginning of an L2 header in the packet) and the bit offset indicator 514 specifies a number of bits to be advanced from the byte offset to reach a location of a first bit of the field in the header of the packet. The number of bits indicator 516 specifies a size of the field by specifying the number of bits in the field, in an embodiment. Although the entry 510 is illustrated as having four destination index field identifiers 511, each entry 510 includes other suitable numbers (e.g., 1, 2, 3, 5, 6, etc.) of destination index field identifiers 511 in other embodiments. In some embodiments, one or more destination index field identifiers 511 are used to identify fields in entries 510 corresponding to some packet types and are unused (e.g., as indicated by a default value) in entries 510 corresponding to other packet types. In an embodiment, each entry 510 of the destination index table 500 additionally includes a destination index constant 518 and a maximum destination index 520. The destination index constant 518 and the maximum destination index 520 enable partitioning of the destination index table 500 into multiple different logical tables, such as a multicast logical table and a unicast logical table, so that only a single logical table need be accessed on behalf of a particular packet, in an embodiment.

Referring to FIGS. 3 and 5A, the destination index generator 310 accesses the destination index table 328 using packet type index 307 and retrieves, from the destination index table 328 destination index field identifiers (e.g., the destination index field identifiers 511) corresponding to the packet type. The destination index generator 310 then extracts the specified fields from the specified locations and of the specified sizes in the header of the packet, and concatenates the extracted fields to generate a destination index for the packet. For example, in an embodiment, the destination index generator 310 extracts a destination ID, such as an IEEE 802.1BR E-Tag ECID, from a forwarding tag included in the header of a packet, and generates the destination index to include the destination ID.

Similar to the destination index generator 310, the source index generator 312 is configured to determine, based on the packet type index 307, respective locations and sizes of the one or specific header fields to be included in the source index 318, in an embodiment. In an embodiment, the source index generator 312 is coupled to a source index table 330, and the source index generator 312 is configured to obtain, from the source index table 330, respective locations and sizes of the one or specific header fields to be included in the source index 318. Referring to FIG. 5B, a source index table 550 corresponds to the source index table 330, in an embodiment. The source index table 550 is generally the same as the destination index table 500 of 5A, in an embodiment. The source index table 550 includes a plurality of entries 560 indexed by the packet type index. Each entry 560 identifies one or more specific header fields, within a header of a packet of the corresponding packet type, to be included in a source index for the packet. An entry 560 includes source index field identifiers 561, each source index field identifier 561 including a byte offset indicator 562, a bit offset indicator 564 and a number of bits indicator 566, in an embodiment. As an example, a source index field identifier 561 identifies a source ID field in a forwarding tag in a header of a packet, and specifies a location and a size of the source ID field for the packet type corresponding for the packet. Thus, the location and/or the size of the source ID field can be different in different packets, for example in packets having forwarding tags of different formats, in embodiments. Although the entry 560 is illustrated as having four source index field identifiers 561, each entry 550 includes other suitable numbers (e.g., 1, 2, 3, 5, 6, etc.) of source index field identifiers 561 in other embodiments. Similar to the destination table 500 of FIG. 5A, in an embodiment, each entry 560 of the source index table 550 additionally includes a destination index constant 568 and a maximum destination index 570. The source index constant 568 and the maximum destination index 570 enable partitioning of the source index table 550 into multiple different logical tables, such as a multicast logical table and a unicast logical table, so that only a single logical table need be accessed on behalf of a particular packet, in an embodiment.

Referring to FIGS. 3 and 5B, the source index generator 312 accesses the source index table 330 using the packet type index 307 and retrieves, from the source index table 330, source index field identifiers (e.g., the source index field identifiers 561) corresponding to the packet type. The source index generator 312 then extracts the identified fields from the specified locations and of the specified sizes in the header of the packet, and concatenates the extracted fields to generate the source index 318 for the packet. For example, in an embodiment, the source index generator 312 extracts a source ID, such as an IEEE 802.1BR E-Tag ingress ECID, from a forwarding tag included in the header of a packet, and generates the source index to include the source ID. As another example, in an embodiment, the source index generator 312 extracts a VLAN ID from an IEEE 802.1Q tag included in the header of a packet, and generates the source index to include the VLAN ID.

Because the specific fields to be extracted from headers of packets, and the locations and sizes of the specific fields to be extracted from the header of packets, are specified based on packet types corresponding to the packets, the destination index generator 310 and/or the source index generator 312 are configured to extract fields at varying locations and of varying sizes from different packets depending on the packet types, in an embodiment. As a result of flexible specification of specific header fields to be extracted from different packet types, the destination index generator 310 and/or the source index generator 312 can support forwarding tags of various formats, where destination and/or source IDs and, in some cases, other relevant information, are of different sizes and are located in different locations within the forwarding tags. This allows, for example, use of custom (e.g., proprietary) forwarding tag formats that utilize shorter (or longer) forwarding tags, and/or that utilize shorter (or longer) destination and/or source IDs within the forwarding tags, as compared to forwarding tags of standard formats, such as 802.1BR E-tags, in at least some embodiments. As an example, a custom forwarding tag format may be utilized with the PE 120-1, and the destination index generator 310 and/or the source index generator 312 may be easily configured (or reconfigured) to extract custom shorter (or longer) destination and/or source IDs from the custom forwarding tag, in an embodiment. For example, in an embodiment, the destination index generator 310 is configured (or reconfigured) to extract a custom shorter (or longer) destination ID from a custom forwarding tag by including, in the packet type table 308 an entry classifying packets that include the custom forwarding tag to a particular packet type, and including, in the destination index table 328, an entry corresponding to the particular packet type, the entry indicating a location and a size of a custom destination ID field to be extracted from the custom forwarding tag in the header of the packet. Similarly, in an embodiment, the source index generator 312 is configured (or reconfigured) to extract a custom shorter (or longer) source ID from the custom forwarding tag by including, in the source index table 330, an entry corresponding to the particular packet type, the entry indicating a location and a size of a custom source ID field to be extracted from the custom forwarding tag in the header of the packet.

The header parser 300 also includes a hash generator 334 coupled to the L3/L4 offset calculator 302, in an embodiment. The hash generator 334 is configured to extract one or more header fields from, for example, L2, L3 and/or L4 header of a packet, and to generate a hash index 340 based on information obtained from the one or more extracted header fields. In an embodiment, the hash generator 334 is configured to classify a packet to a packet hash type, and to identify, based on the packet hash type, the one or more header field in the L2, L3 and/or L4 to be included in a hash index 335 for the packet. The hash generator 334 is configured to classify a packet to a packet hash type based, for example, on initial information extracted from a header of the packet. In an embodiment, the hash generator 334 is configured to classify a packet to one the following types: IPv4 TCP/UDP; IPv6 TCP/UD; IPv4 non-TCP/UDP or fragment; IPv6 non-TCP/UDP or fragment; multiprotocol label switching (MPLS) with single label stack; MPLS with more than one label in a label stack. In some embodiments, the packet hash types also include one or more user defined Ether-types. In some embodiments, the packet hash types include a default type, such as a default Ethernet type. The hash generator 334 is configured to classify a packet to the default type if the packet does not match any other supported packet hash type, in an embodiment.

In an embodiment, the hash generator 334 is coupled to a packet hash type table 338, and the hash generator 334 is configured to access the packet hash type table 338 based on initial information from a header of a packet to obtain an a packet hash type index 340 corresponding to the packet. In an embodiment, the packet hash type table 338 is implemented in a CAM, such as a binary CAM or a TCAM, for example. In another embodiment, the packet hash type table 338 is implemented in a suitable memory other than a CAM. The packet hash type table 338 includes a plurality of entries respectively corresponding to different packet hash types. The hash generator 334 is configured to search the packet hash type table 338 to find an entry that matches the initial header information provided to the packet hash table 338. Based on the matching entry (e.g., a first match or a best match) in the packet hash type table 338, the packet hash type generator 334 obtains the packet hash type index 340 corresponding to the packet. For example, the packet type index 340 corresponds to the index of the matching entry in the packet hash type table 338, in an embodiment.

The hash generator 334 is also coupled to a hash key mask table 342, in an embodiment. The hash key mask table 342 comprises a plurality of entries indexed by the packet hash type index 340. An entry in the hash key mask table 342 stores a bitmask to be applied to the L2, L3 and/or L4 header of a packet classified to the corresponding packet hash type. The bitmask selects bits/bytes from the L2, L3 and/or L4 header to be included in a hash key for a packet of the corresponding packet hash type. For example, the bitmask selects 40 bytes from the L2, L3 and/or L4 header to be included in the hash key, in an embodiment. In another embodiment, the bitmask selects another suitable number of bits/bytes from the L2, L3 and/or L4 header to be included in the hash key. The hash generator 334 accesses the hash key mask table 342 using the packet hash type index 340 determined for a packet, and retrieves, from the corresponding entry in the hash key mask table 342, a bitmask for generating a hash key for the packet. The hash generator 334 generates the hash key for the packet by applying the bitmask to the L2, L3 and/or L4 header of the packet, in an embodiment. The hash generator 334 then generates the hash index 335 based on the hash key, for example by applying a cyclic redundancy check (CRC) function (e.g., CRC32) to the hash key, in an embodiment.

Figure 6:
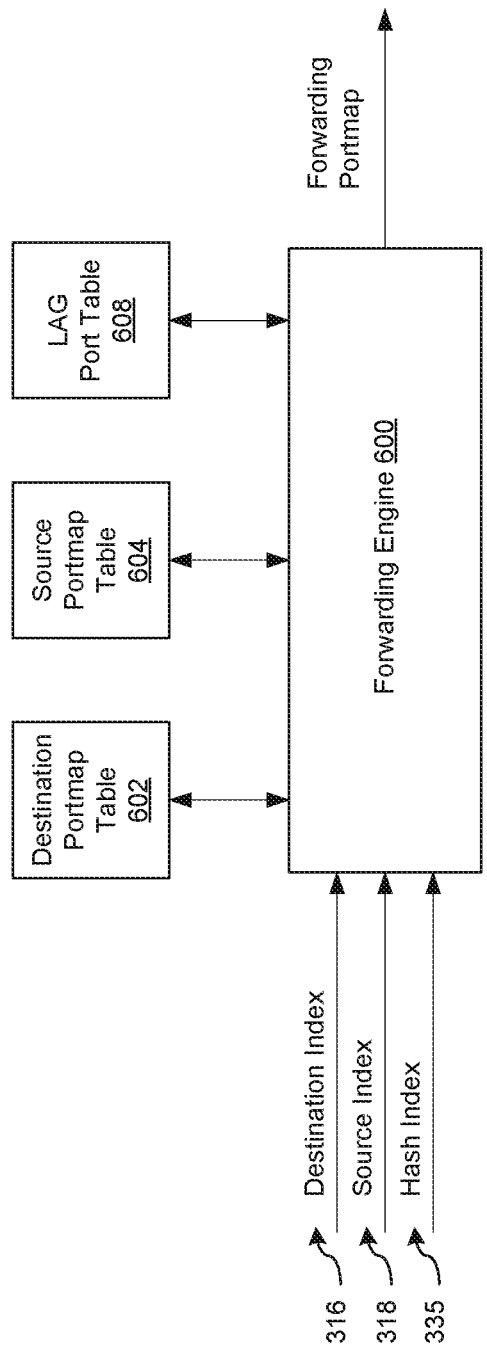
FIG. 6 is a block diagram of a forwarding engine utilized with the header parser of FIG. 3, in an embodiment.

Referring now to FIG. 6, a forwarding engine 600 corresponds to the forwarding engine 204 of FIG. 2, in an embodiment. The forwarding engine 600 receives, as inputs, one or more of the destination index 316, the source index 318, and hash index 340, in an embodiment.

In an embodiment, the forwarding engine 600 is coupled to a destination portmap table 602. The destination portmap table 602 comprises a plurality of entries indexed by the destination index 316. Each entry of the destination portmap table 602 stores a destination port bitmap that indicates destination ports to which to forward the corresponding packets. In an embodiment, each entry of the destination portmap table 602 stores a 17-bit destination port bitmap, each bit corresponding to a respective one of 17 ports of the PE 120-1. In another embodiment, each entry of the destination portmap table 602 stores a destination port bitmap having a suitable number of bits other than 17 bits, the bits respectively corresponding to a suitable number of ports other than 17 ports. A first value of a bit (e.g., a logic 1) in the destination portmap indicates that the packet is to be forwarded to the corresponding port, and a second value of a bit (e.g., a logic 0) in the destination bitmap indicates that the packet is not to be forwarded to the corresponding port, in an embodiment. The forwarding engine 600 is configured to access the destination portmap table 602 based on destination index 316 generated for a packet, and to retrieve a destination port bitmap from the corresponding entry in the destination portmap table 602 to be used for determining destination port or ports to which to forward the packet, in an embodiment.

The forwarding engine 600 is also coupled to a source portmap table 604. The source portmap table 604 comprises a plurality of entries indexed by the source index 318. Each entry of the source portmap table 604 stores a source port compliment bitmap that masks source ports of corresponding packets, to implement source port filtering for the corresponding packet. In an embodiment, each entry of the source portmap table 604 stores a 17-bit destination port compliment bitmap, each bit corresponding to a respective one of 17 ports of the PE 120-1. In another embodiment, each entry of the source portmap table 604 stores a source port compliment bitmap having a suitable number of bits other than 17 bits, the bits respectively corresponding to a suitable number of ports other than 17 ports. A first value of a bit (e.g., a logic 1) in the source port compliment bitmap indicates that the corresponding port is not to be masked out for the packet, and a second value of a bit (e.g., a logic 0) in the source port compliment bitmap indicates that the corresponding port is to be masked out for the packet, in an embodiment. The forwarding engine 600 is configured to access the source portmap table 604 based on the source index 318 generated for a packet, and to retrieve a source port complementary bitmap from the corresponding entry in the source portmap table 604 to be used for masking out the source port or ports for the packet, in an embodiment.

The forwarding engine 600 is additionally coupled to a LAG designated portmap table 606, in an embodiment. The LAG designated portmap table 606 comprises a plurality of entries indexed by the hash index 335. Each entry of the LAG designated portmap table 606 stores a LAG port bitmap that indicates a port (or ports), in a LAG, to which to forward corresponding packets. In an embodiment, each entry of the LAG destination portmap table 606 stores a 17-bit LAG port bitmap, each bit corresponding to one of 17 ports of the PE 120-1. In another embodiment, each entry of the LAG designated portmap table 606 stores a destination port bitmap of another suitable number of bits respectively corresponding to another suitable number of ports of the PE 120-1. A first value of a bit (e.g., a logic 1) in the LAG designated portmap table 606 indicates that the corresponding port is either i) a non-LAG port (i.e., a port that is not a member of a LAG) or ii) is a designated LAG port for the corresponding packet. A second value of a bit (e.g., a logic 0) in the LAG designated portmap table 606 indicates that the corresponding port is a member of the LAG that is not designated for the corresponding packet. Accordingly, the second value of a bit (e.g., a logic 0) in the LAG designated portmap table 606 indicates that a LAG port is to be masked out for the packet, in an embodiment. The forwarding engine 600 is configured to access the LAG designated portmap table 606 based on hash index 335 generated for a packet, and to retrieve a LAG bitmap from the corresponding entry in the LAG designated portmap table 606 to be used for masking out non-designated LAG port or ports, in an embodiment.

In an embodiment, upon retrieving a destination bitmap from the destination portmap table 602 based on the destination index 316 generated for a packet, a source compliment bitmap from the source portmap table 604 based on the source index 318 generated for the packet, and a LAG bitmap from the LAG designated portmap table 606 based on the hash index 335 generated for the packet, the forwarding engine 600 determines a forwarding portmap for forwarding the packet. In an embodiment, the forwarding engine 600 determines the forwarding portmap by combining the retrieved destination bitmap, the retrieved source compliment bitmap and the LAG designated port bitmap via AND operations. In this embodiment, the forwarding engine 600 determines the forwarding portmap according to: Forwarding_Portmap=Detination_Portmap_Table [Dst_Indx] & Source_Portmap_Table[Src_Indx] & LAG_Desingnated_Portmap_Table[Hash_Indx]. The forwarding engine 600 then forwards the packet to each port indicated by a first value (e.g., a logic 1) in the forwarding portmap for subsequent transmission of the packet. For example, the forwarding engine 600 forwards the packet to each port indicated by a first value (e.g., a logic 1) in the forwarding portmap by including indications of these ports in a packet descriptor corresponding to the packet, or by including the entire forwarding portmap in the packet descriptor, in various embodiments.

Referring back to FIG. 3, the packet type index 307 is additionally provided to a class of service (CoS) determination engine 350, in an embodiment. The CoS engine 350 is configured to obtain, based on the packet type index 307, a CoS index 352 corresponding to the packet type. Based on the CoS index 352, the CoS engine 350 obtains quality of service (QoS) attributes for the packet. The QoS attributes obtained for the packet are provided to a TX queue manager (e.g., the TX queue manager 206 of FIG. 2) to be used for performing quality of service operations with respect to the packet, such as determining whether to drop the packet in case of congestion, determining appropriate queue(s) into which to place the packet, etc.

Figure 7A:
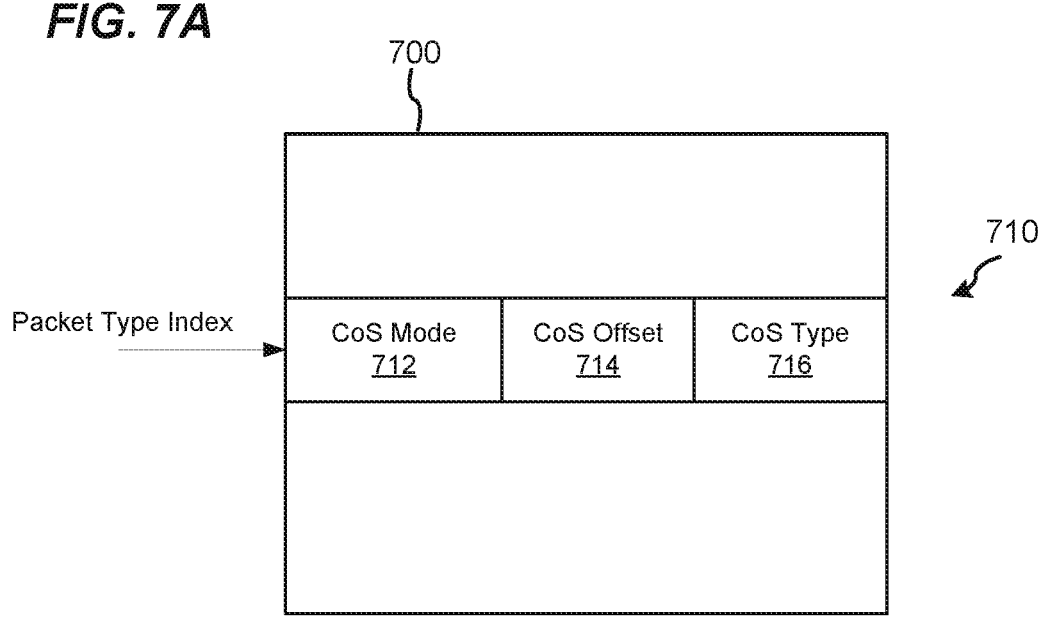
FIG. 7A is a diagram of a class of service index table utilized with the header parser of FIG. 3, according to an embodiment.

In an embodiment, the CoS engine 350 is coupled to a CoS index table 354 and one or more CoS to QoS map tables 356. Referring to FIG. 7A, a CoS index table 700 corresponds to the CoS index table 354 of FIG. 3, in an embodiment. The CoS index table 700 comprises a plurality of entries 710 indexed by the packet type index 307. Each entry 710 includes a CoS mode indication 712, a CoS offset indication 714 and a CoS type indication 716, in an embodiment. The CoS mode indication 712 indicates whether the packet is to be processed in port default CoS mode, a packet CoS mode or an explicit L2 CoS mode, in an embodiment. The CoS offset indicator 714 indicates a number of bits (e.g., in the range of 1 bit-6 bits). The CoS type indicator 716 indicates whether L2 CoS, L3 CoS or MPLS CoS is to be applied to the packet.

Referring back to FIG. 3, the CoS engine 350 is configured to access the CoS index table 354 based on the packet type index 307, and to retrieve, from an entry corresponding to the packet type index 307 in the CoS index table 354, a CoS index 352 corresponding to the packet. Based on the CoS index 352 obtained from the CoS index table 354, the CoS engine 350 accesses one of the one or more CoS to QoS map tables 356 to obtain QoS attributes to be used for the packet. In an embodiment, the one or more CoS to QoS map tables 356 include an L2 CoS table, an L3 CoS table and an MPLS CoS table. In an embodiment, the CoS engine 350 is configured to determine which particular one of the one or more CoS to QoS map tables 356 to access based on a CoS type indicator (e.g., the CoS type indicator 716 of FIG. 7A) obtained from the entry in the CoS index table 354, in an embodiment.

Figure 7B:
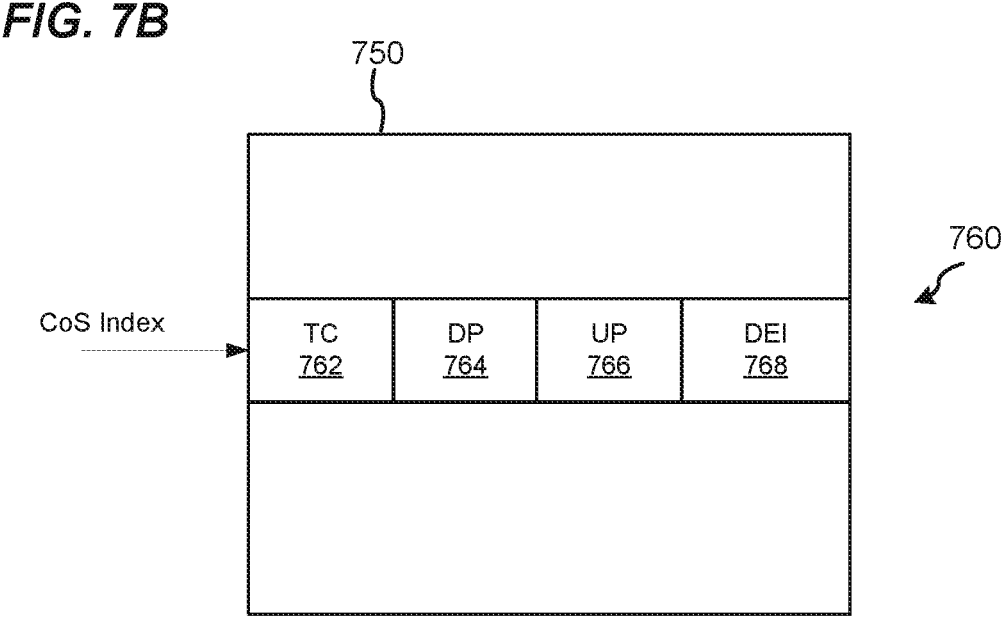
FIG. 7B is a diagram of a class of service to quality of service mapping table utilized with the header parser of FIG. 3, according to an embodiment.

Referring now to FIG. 7B, a CoS to QoS map table 750 corresponds to a particular one of the one or more CoS to QoS map tables 356 of FIG. 3, in an embodiment. The CoS to QoS map table 750 comprises a plurality of entries 760 indexed by the CoS index (e.g., CoS index 352). Each entry 760 includes a plurality of QoS indicator fields, including a traffic class (TC) field 762, a drop precedence (DP) field 764, a user priority (UP) field 766, and a drop eligibility indicator (DEI) field 768. In other embodiments, an entry 760 of the CoS to QoS map table 750 omits one or more of the QoS indicator fields illustrated in FIG. 7B and/or includes one or more additional QoS indicators not illustrated in FIG. 7B.

With continued reference to FIG. 7B, the TC field 762 indicates a traffic class to be used, for example, to select a priority level for queuing a packet of the corresponding CoS type, in an embodiment. The DP field 764 indicates a drop precedence to be used for deciding to whether or not to drop a packet of the corresponding CoS type in case of congestion, allowing packets with relatively lower drop precedence to be dropped less often as compared with packets with relatively higher drop precedence, for example, in an embodiment. The UP field 766 indicates a user priority to be used, for example, to select a priority level for queuing a packet of the corresponding CoS type, in an embodiment. The DEI field 768 indicates whether or not a packet of the corresponding CoS type can be dropped in case of congestion, in an embodiment.

Figure 8A:
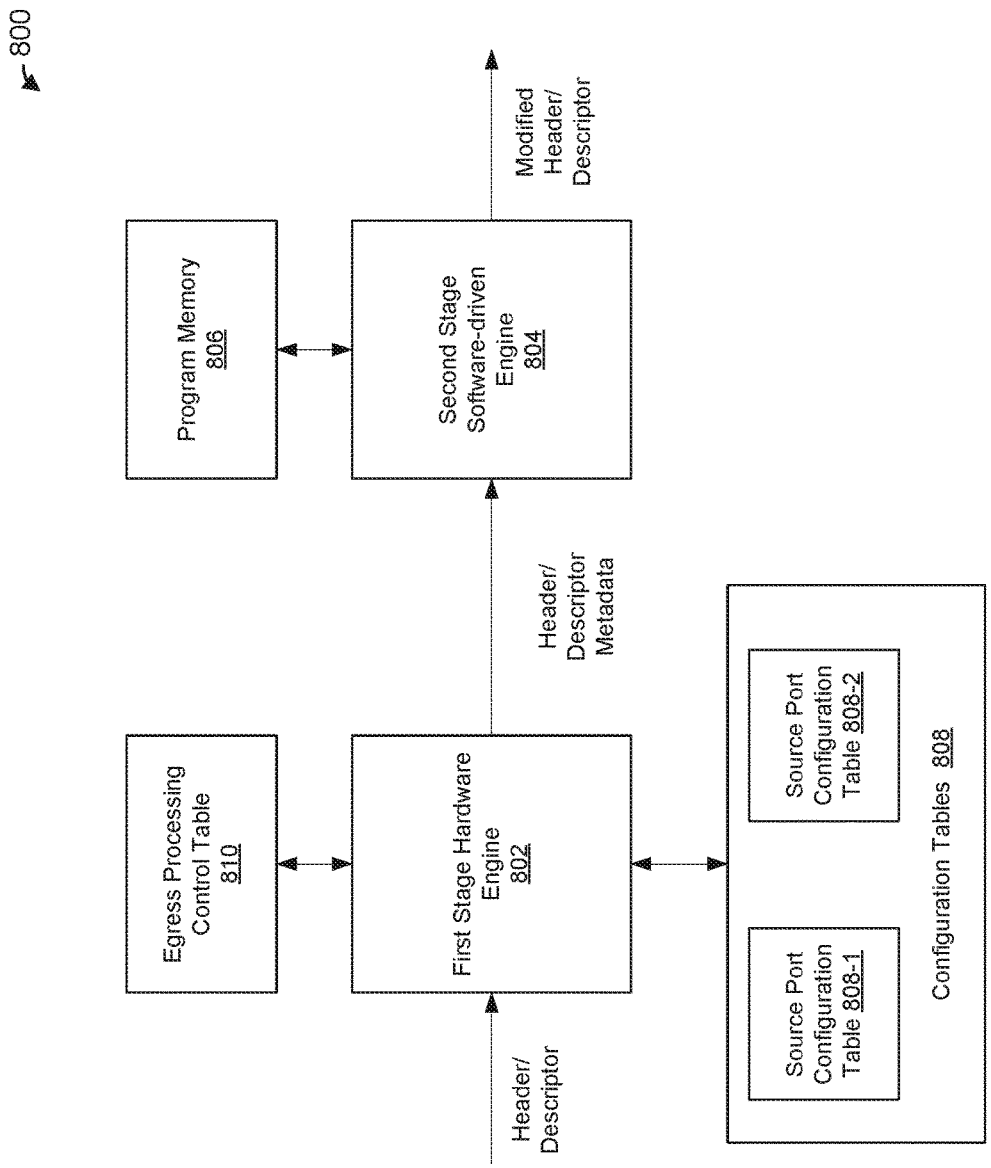
FIG. 8A is a block diagram of a header alteration engine utilized with the packet processor of FIG. 2, according to an embodiment.

FIG. 8A is a block diagram of a header alteration engine 800, according to an embodiment. In an embodiment, the header alteration engine 800 corresponds to the header alteration engine 208 of the packet processor 200 of FIG. 2. In another embodiment, the header alteration engine 800 is used with a packet processor different from the packet processor 200 of FIG. 2. Similarly, the header alteration engine 208 of the packet processor 200 of FIG. 2 is a suitable header alteration engine different from the header alteration engine 800, in some embodiments. In some embodiments, the header alteration engine 800 is included in (i.e., is a part of) an egress processor configured to perform in other egress processing operations in addition to header alteration operations.

The header alteration engine 800 (or an egress processor of which the header alteration engine 800 is a part) includes a first stage, hardware, engine 802 coupled to a second stage, software-driven, processor 804. The first stage engine 802 is implemented entirely in hardware, such as in one or more application-specific integrated circuits (ASICs), in an embodiment. The second stage processor 804 is coupled to a program memory 806 storing computer-readable instructions, and the second stage processor 804 is configured to execute computer-readable instructions stored in the program memory 806. Generally, implementing at least a portion of egress processing via computer-readable instructions provides greater flexibility in types of egress processing operations that can be performed with respect to packets being processed by the egress processor 800 as compared to systems in which egress processing is implemented entirely in hardware, in at least some embodiments. Further, in at least some embodiments, because at least a portion of egress processing is implemented via computer-readable instructions, the header alteration engine 800 (or the egress processor of which the header alteration engine 800 is a part) can be easily reconfigured and/or reprogrammed to perform specific egress processing operations for specific port extender protocols and/or for specific applications.

In an embodiment, the program memory 806 stores a plurality of sets of computer-readable instructions, such as a plurality of computer-readable instruction threads. Respective ones of the sets of computer-readable instructions stored in the program memory 806 are for performing respective sets of different egress processing operations with respect to different packets, in an embodiment. As an example, a first set of computer-readable instructions stored in the program memory 806, when executed by the second stage processor 804, modifies a header of a packet to insert a forwarding tag into the header; a second set of computer-readable instructions stored in the program memory 806, when executed by the second stage processor 804, modifies a header of a packet to remove a forwarding tag from the header; a third set of computer-readable instructions stored in the program memory 806, when executed by the second stage processor 804, modifies a header of a packet to remove a forwarding tag from the header and to add an ECN mark to the header; and so on, in various embodiments.

In an embodiment, the particular set of egress processing operations to be performed with respect to a particular packet depends, for example, on a port via which the packet was received, a port or ports via which the packet is to be transmitted, a type of the packet, a format of the packet, etc. However, if identification of the corresponding particular set of computer-readable instructions was performed by relatively slower software operations, for example via a branching decision performed by executing computer-readable instructions stored in the program memory 806, egress processing of the packet would take a relatively long time and, in at least some cases, would not be able to be performed at full-wire speed.

In an embodiment, identification of the particular set of computer-readable instructions to be executed with respect to a packet is performed by the first stage engine 802, implemented in hardware. For example, the first stage engine 802 analyzes one or more attributes associated with a packet, such as one or more fields from a header of the packet, an indication of a port via which the packet was received, an indication of a port via which the packet is to be transmitted, a type of the packet (e.g., the packet type index 307 generated for the packet by the packet type determination of FIG. 3), etc., and to obtain (e.g., retrieve from a memory), based on analyzing the one or more attributes, an indication of (e.g., a pointer to) the particular set of computer-readable instructions to be executed with respect to the packet, such as a pointer to a memory location at which an initial computer-readable instruction of the particular set of computer-readable instructions is stored in the program memory 806. The indication of the particular set of computer-readable instructions to be executed is provided to the second stage processor 804. The second stage processor 804, based on the indication received from the fist stage engine 802, retrieves the corresponding set of computer-readable instructions from the program memory 806, and executes the retrieved set of computer-readable instructions to perform the corresponding set of egress processing operations with respect to the packet. In embodiments, identifying particular sets of computer-readable instructions in a first, hardware, stage, and executing the identified computer-readable instructions in a second software-driven stage, allows the header alteration engine 800 (or the egress processor of which the header alteration engine 800 is a part) to combine flexibility provided by computer-readable instructions for performing egress processing operations with speed of execution of the computer-readable instructions to, for example, implement flexible egress processing at full-wire speed. For example, identifying the particular set of computer-readable instructions in hardware reduces or eliminates relatively slower branching operations that would otherwise be implemented via computer-readable instructions to identify the particular sets of computer-readable instructions (e.g., a particular branch of computer-readable instructions), in an embodiment Referring still to FIG. 8A, in an embodiment, the first stage engine 802 is coupled to one or more configuration tables 808. The one or more configuration tables 808 include a source port configuration table 808-1 and a target port configuration table 808-2, in an embodiment. The source port configuration table 808-1 comprises a plurality of entries respectively corresponding to ports of the PE 120-1, in an embodiment. Each entry of the source port configuration table 808-1 stores port configuration attributes relevant to packets received via the corresponding port, such as a type or format of a forwarding tag used for forwarding packets received via the port, for example. Similarly, each entry of the target port configuration table 808-2 stores port configuration attributes relevant to packets to be transmitted via the corresponding port, such as forwarding tag format and/or flow control protocols supported for packets transmitted via the port, for example. The first stage engine 802 is configured to access the source port configuration table 808-1 based on a source port of a packet, and to retrieve, from the source port the source port configuration table 808-1, a corresponding entry specifying source port configuration attributes relevant to egress processing of the packet, in an embodiment. Similarly, the first stage engine 802 is configured to access the target port configuration table 808-2 based on a target port of a packet, and to retrieve, from the target port configuration table 808-2, a corresponding entry specifying target port configuration attributes relevant to egress processing of the packet, in an embodiment.

The first stage engine 802 is also coupled to an egress processing control table 810. In an embodiment, the egress processing control table 810 comprises a plurality or entries respectively corresponding to one or more of respective source ports of the PE 120-1, respective target ports of the PE 120-1, and respective types of packets that the PE 120-1. In an embodiment, each entry of the egress processing control table 810 stores an indicator of (e.g., a pointer to) a particular set of computer-readable instructions, of a plurality of sets of computer-readable instructions, stored in the program memory 806. Additionally, each of at least some entries of the egress processing control table 810 stores a forwarding tag template to be inserted into the packet. In an embodiment, forwarding tag templates are different in at least some of the entries in the egress processing control table 810. For example, a first forwarding template in a first entry of the egress processing control table 810 (e.g., corresponding to a first target port) conforms to a first forwarding tag format (e.g., the FEE 802.1BR format) and a second forwarding template in a second entry of the egress processing control table 810 (e.g., corresponding to a second target port) conforms to a second forwarding tag format (e.g., the DSA tag format). The forwarding tag template is populated with some or all header information as specified for the corresponding forwarding tag format. For example, a first forwarding tag is populated with a source ID (and/or destination ID) of a first size and at a first location within the first forwarding tag, as defined by a first forwarding tag format, and a second forwarding tag is populated with a source ID (and/or destination ID) of a second size, different from the first size, and/or at a second bit location, different from the first bit location, within second forwarding tag, in an embodiment. The first stage engine 802 is configured to access the egress processing control table 810 based on, for example, one or more of a source port of a packet, a target port of the packet, a type of the packet, etc., and to retrieve, form an entry corresponding to the one or more of the source port of the packet, the target port of the packet, the type of the packet, etc., metadata corresponding to the packet, in an embodiment. The metadata extracted from the entry in the egress processing control table 810 includes an indicator of (e.g., a pointer to) a particular set of computer-readable instructions to be executed by the second stage processor 804 with respect to the packet, in an embodiment. The metadata extracted from the entry in the egress processing control table 810 additionally includes a forwarding tag template to be inserted into a header of the packet, in an embodiment. The metadata extracted from the entry in the egress processing control table 810 is provided to second stage processor 804, in an embodiment.

Figure 8B:
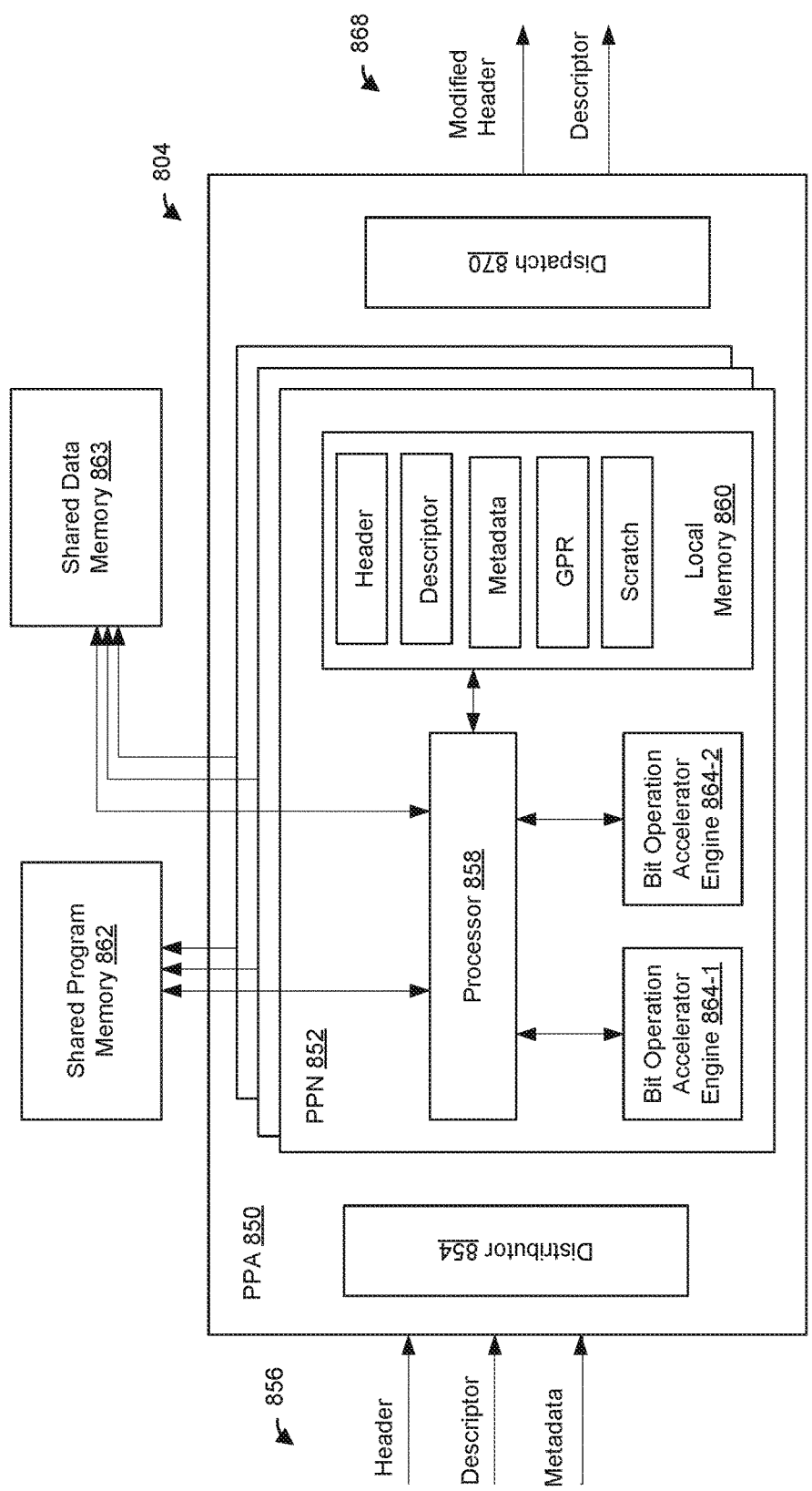
FIG. 8B is a block diagram of a second stage processor of the header alteration engine of FIG. 8A, according to an embodiment.

FIG. 8B is a block diagram of the second stage processor 804 of FIG. 8A, according to an embodiment. The second stage processor 804 includes a packet processing array (PPA) 850 having a plurality of packet processing nodes (PPN) 852. In an embodiment, the PPNs 852 are configured to perform egress processing of respective packets simultaneously so that egress processing of multiple packets is performed in parallel. A distributor engine 854 receives packet information 856 corresponding to a packet, and distributes the packet information to a PPN 852 for performing egress processing with respect to the packet. In an embodiment, the packet information 856 includes one or more of i) a header of the packet, ii) a packet descriptor associated with the packet and iii) metadata generated by the first stage engine 802 for the packets. In an embodiment, the distributor 854 implements an in-order distribution scheme in which packet information 856 corresponding to different packets is distributed to the PPNs 852 in the same order in which the packet information 856 is received by the distributor 854.

In an embodiment, the PPNs 852 include respective processor 858 coupled to respective local memories 860. In operation, a processor 858 receives packet information 856 distributed to the corresponding PPN 852, and stores the packet information in the local memory 860. For example, the processor 858 stores the header of the packet, the packet descriptor associated with the packet, and the metadata included in the packet information 856 in the local memory 860, in an embodiment. The local memory 860 additionally stores a scratch pad and one or more general purpose registers used during performing egress processing with respect to the packet, in some embodiments.

In an embodiment, the processors 858 of the respective PPNs 852 are coupled to a shared program memory 862. In some embodiments, the processors 858 of the respective PPNs 852 are further coupled to a shared data memory 863. The shared program memory 862 corresponds to the program memory 806 of FIG. 8A, in an embodiment. The shared program memory 862 stores a plurality of sets of computer-readable instructions (e.g., respective computer-readable instruction threads), respective ones of the sets for performing respective sets of egress processing operations. When a processor 858 receives packet information 856 corresponding to a packet, the processor 858 retrieves a particular set of computer-readable instructions from the shared program memory 862 based on the indicator of, e.g., a pointer to, the particular set of computer-readable instructions obtained from the metadata included in the packet information 856. The processor 858 executes the particular set of computer-readable instructions to perform the corresponding set of egress processing operations with respect to the packet. For example, if the packet is a packet ingressing the network switching system 100, the packet processor 858 executes the set of computer-readable instructions to insert a forwarding tag into the header of the packet provided in the packet information 856. As another example, if the packet is a packet egressing the network switching system 100, the processor 858 executes the set of computer-readable instructions to strip a forwarding tag from the header of the packet provided in the packet information 856. As yet another example, the processor 858 executes the set of computer-readable instructions to perform a security check on the packet and to determine, based on the security check, whether or not to drop the packet. As still another example, the processor 858 executes the set of computer-readable instructions to modify afield (e.g., a MAC address field, an IP header ECN field, etc.) In the header of the packet provided in the packet information 856.

In some embodiments, the processor 858 is coupled to one or more hardware accelerator engines 864. The one or more hardware accelerator engines 864 are configured to perform respective specific operations that would take significantly longer (e.g., twice as long, four times as long, one hundred times as long, etc.) to be performed via computer-readable instructions, in an embodiment. For example, the one or more hardware accelerator engines 864 are configured to perform respective information shifting operation to shift fields in headers of packets, for example for insertion of tags into the packets and/or for removal of tags from the packets. As a more specific example, in an embodiment, the one or more hardware accelerator engines 864 include a bit operation accelerator engine 864-1 configured to shift fields in headers of packets by given numbers of bits, and a byte operation accelerator engine 864-1 configured to shift fields in headers of packets by given numbers of bytes, in an embodiment. During execution of the set of computer-readable instructions, the processor 858 engages hardware accelerator engines 864 to perform the corresponding operations. In at least some embodiments, engaging hardware accelerator engines 864 to perform the processing operations allows the packet processor 858 to, for example, more quickly insert a tag (e.g., a forwarding tag) into a header of a packet and/or to more quickly strip a tag (e.g., a forwarding tag) from a header of a packet as compared to an implementation in which a processor executing computer-readable instructions does not engage hardware engines to perform the operations (e.g., the information shifting operations). In at least some embodiments, engaging hardware accelerator engines 864 to perform the processing operations enables the processor 858 to perform egress processing of packets at full-wire speed.

After completion of performing egress processing with respect to the packet, the PPN 852 provides processed packet information 868 to a dispatch engine 870. The processed packet information includes a modified (or unmodified) header of the packet and a modified (or unmodified) descriptor associated with the packet, in an embodiment. The dispatch engine 870 dispatches the processed packets from the second stage processor 804. In an embodiment, the dispatch engine 870 implements an in-order distribution scheme in which the packet information is dispatched from the PPNs 852 in the same order in which the packet information is received by the dispatch engine 870.

Figure 9:
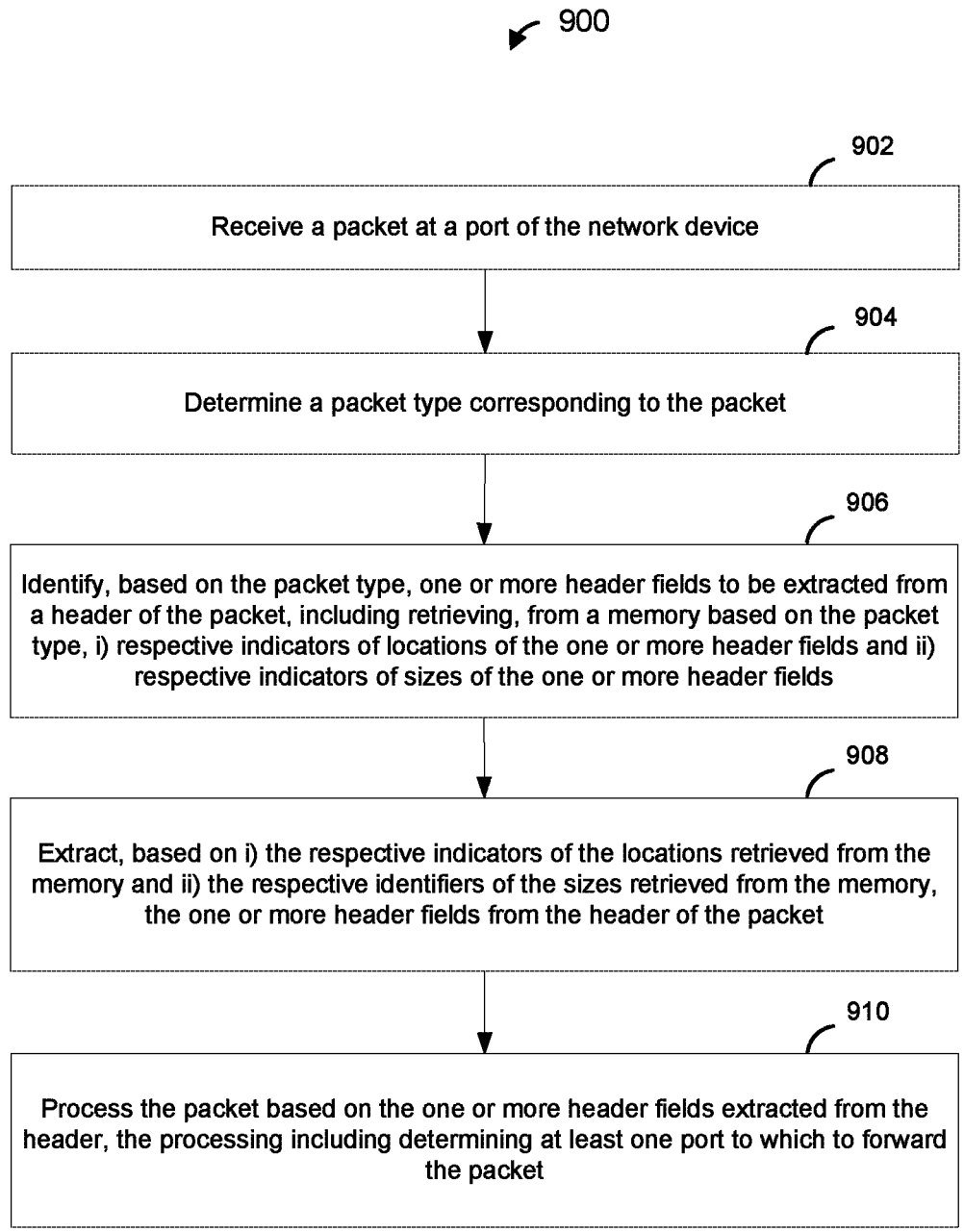
FIG. 9 is a flow diagram of an example method for processing of packets ingressing a network device, according to an embodiment.

FIG. 9 is a flow diagram of an example method 900 for processing of packets ingressing a network device, such as a PE device, according to an embodiment. The method 900 is implemented at least partially by the header parser 300 of FIG. 3 operating in the PE 120-1 of FIG. 1, in an embodiment. In other embodiments, however, the method 900 is implemented by another suitable ingress processor device and/or with another suitable network device. For ease of explanation, the method 900 is described with reference to the PE 120-1 of FIG. 1 and the header parser 300 of FIG. 3.

At block 902, a packet is received via a port of a network device. For example, the packet is received via a port 124, 128 of the PE 120-1.

At block 904, a packet type corresponding to the packet received at block 902 is determined. In an embodiment, the packet type determination engine 306 of FIG. 3 determines the packet type. The packet type is determined based on i) initial information obtained from a header of the packet and ii) additional information obtained other than from the header of the packet, in an embodiment. In some embodiments, the packet type is determined based on a packet type key generated for the packet. For example, the packet type is determined based on the packet type key 400 of FIG. 4, in an embodiment. In an embodiment, the packet type key is applied to a content addressable memory to find a matching entry to determine the packet type. In other embodiments, the packet type is determined using other suitable techniques. In an embodiment, determining the packet type includes generating a packet type index corresponding to the packet type.

At block 906, based on the packet type determined at block 904, one or more header fields to be extracted from a header of the packet are identified. In an embodiment, identifying the one or more header fields retrieving, from a memory based on the packet type, i) respective indicators of locations of the one or more header fields and ii) respective indicators of sizes of the one or more header fields. In some embodiments, identifying the one or more header fields includes accessing, based on the packet type (e.g., using packet type index), one or more forwarding index tables and retrieving, the respective locations and sizes of the one or more header fields from the forwarding index table. For example, identifying the one or more header fields includes accessing a destination index field table (e.g., the destination index field table of FIG. 5A) and/or a source destination index field table (e.g., the destination index field table of FIG. 5B).

At block 908, based on i) the respective indicators of the locations retrieved from the memory and ii) the respective identifiers of the sizes retrieved from the memory at block 906, the one or more header fields are extracted from the header of the packet. In some embodiments, one or more forwarding indices are generated using the extracted one of more header fields. For example, in an embodiment in which identifying the one or more header fields at block 906 includes accessing one or more forwarding index tables, the one or more fields identified in a particular forwarding index table are concatenated together to generate a corresponding forwarding index and to subsequently obtain, based on the forwarding index, a portmap for forwarding the packet, in an embodiment.

At block 910, the packet is processed based on the one or more header fields extracted from the header of the packet at block 908. In an embodiment, processing the packet includes determining at least one port to which to forward the packet. In an embodiment, the at least one port is determined based on or more forwarding indices and/or based on portmaps obtained using the one or more forwarding indices at block 908.

Figure 10:
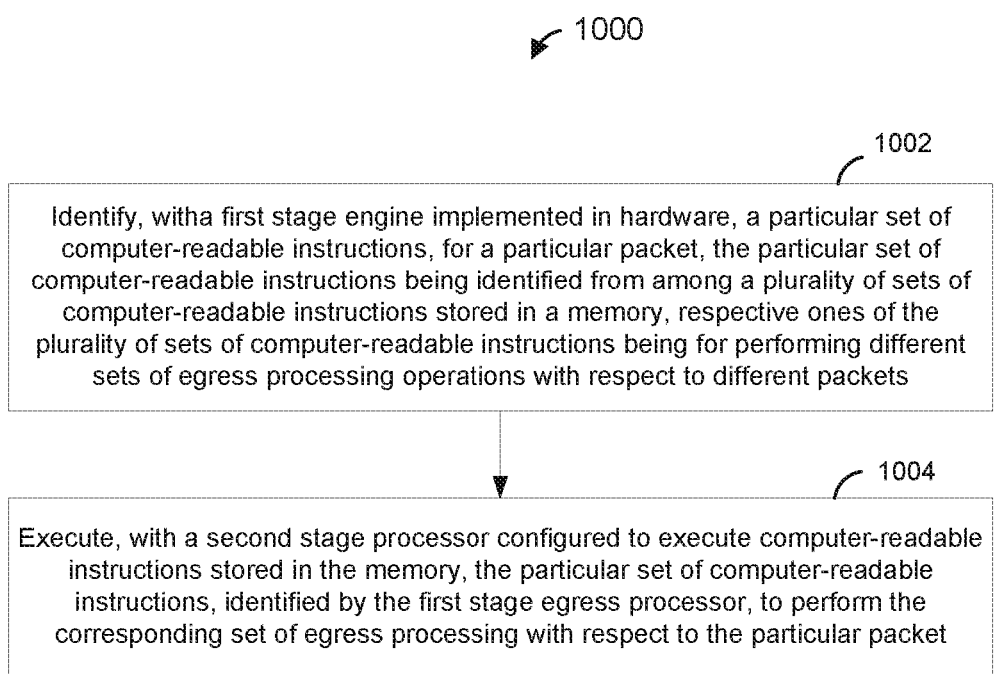
FIG. 10 is a flow diagram of an example method for processing of packets egressing a network device, according to an embodiment.

FIG. 10 is a flow diagram of an example method 1000 for processing of packets egressing a network device, such as a PE device, according to an embodiment. The method 1000 is implemented at least partially by the egress packet processor 800 of FIGS. 8A-8B operating in the PE 120-1 of FIG. 1, in an embodiment. In other embodiments, however, the method 1000 is implemented by another suitable egress processor device and/or with another suitable network device. For ease of explanation, the method 1000 is described with reference to the PE 120-1 of FIG. 1 and the egress packet processor 800 of FIGS. 8A-8B.

At block 1002, a first stage engine implemented in hardware, identifies, for egress processing of a particular packet, a particular set of computer-readable instructions, from among a plurality of sets of computer-readable instructions stored in a memory, the respective ones of the plurality of sets of computer-readable instructions being for performing different sets of header modification operations, in an embodiment. In an embodiment, the first stage engine 802 identifies the particular set of computer-readable instructions from among a plurality of sets of computer-readable instructions stored in the program memory 806. In an embodiment, the particular set of computer-readable instructions is identified based on one or both of i) a source port at which the particular packet was received and ii) a target port to which the particular packet is to forwarded. In some embodiments, the particular set of computer-readable instructions is identified additionally or alternatively based on other information, such as, for example, information obtained from a header of the particular packet, information obtained from a packet descriptor associated with the particular packet, etc. In an embodiment, identifying the particular set of computer-readable instructions includes generating an indicator of (e.g., a pointer to) a memory location in the memory at which the particular set of computer-readable instructions is stored, such as a beginning memory location of the particular set of computer-readable instructions.

At block 1004, a second stage processor configured to execute computer-readable instructions stored in the memory executes the particular set of computer-readable instructions, identified by the first stage engine implemented in hardware, to perform the corresponding set of egress processing operations with respect to the packet. In an embodiment, using a hardware stage to identify a particular set of computer-readable instructions for performing a correspond particular set of egress processing operations and using a processor configured to execute computer-readable instructions to execute the identified set of computer-readable instructions to perform the corresponding particular set of egress processing operations combines flexibility provided by programmability of egress processing operations with the ability to quickly perform particular egress processing operations with respect to various packets, enabling flexible full-wire speed egress processing of packets.

In an embodiment, a method for processing of packets ingressing a network device includes receiving a packet at a port of the network device; performing, with an ingress processor of the network device, ingress processing of the packet, the ingress processing including determining a packet type corresponding to the packet; identifying, based on the packet type, one or more header fields to be extracted from a header of the packet, including retrieving, from a memory based on the packet type, i) respective indicators of locations of the one or more header fields and ii) respective indicators of sizes of the one or more header fields; extracting, based on i) the respective indicators of the locations retrieved from the memory and ii) the respective identifiers of the sizes retrieved from the memory, the one or more header fields from the header of the packet; and processing, with a packet processor of the network device, the packet based on the one or more header fields extracted from the header, the processing including determining at least one port to which to forward the packet.

In other embodiments, the method includes one of, or any suitable combination of two or more of, the following features.

Identifying the packet type includes generating a packet type key corresponding to the packet.

Identifying the packet type further includes searching, based on the packet type key, a content addressable memory to a find an entry matching the packet type key.

Generating the packet type key comprises generating the packet type key to include i) initial information obtained from a header of the packet and ii) additional information obtained other than from the header of the packet.

Generating the packet type key includes generating the packet type key to include one or more user defined fields in the header of the packet.

Generating a packet type index corresponding to the determine packet type.

Retrieving, from a memory based on the packet type, i) respective indicators of locations of the one or more header fields and ii) respective indicators of sizes of the one or more header fields comprises accessing, based on the packet type index, one or more field identifier tables stored in the memory.

Accessing the one or more field identifier tables includes accessing a destination index table that relates packet type indices to identifiers of header fields, the header fields to be included in a destination index to be used for obtaining a destination portmap for forwarding the packet.

Accessing the one or more field identifier tables includes accessing a source index table that relates packet type indices to identifiers of header fields, the header fields to be included in a source index to be used for obtaining a source compliment portmap for masking a source port of the packet.

The method further comprises accessing, based on the packet type index, a class of service (CoS) table stored in the memory, the CoS table relating packet type indices to class of service attributes corresponding to the packet.

The network device is a port extender device, and retrieving, from the memory, i) respective indicators of locations of the one or more header fields and ii) respective indicators of sizes of the one or more header fields includes retrieving, for the memory, a target ID field in a forwarding tag in the header of the packet.

The packet i s a first packet, the method further comprises receiving a second packet at the network device, determining a packet type corresponding to the second packet, and retrieving, from the memory based on the packet type corresponding to the second packet, i) an indicator of a location of a target ID field in a forwarding tag in a header of the second packet and ii) an indicator of a size of the target ID field in a forwarding tag in the header of the second packet.

One or both i) the location of the target ID field in the forwarding tag in the header of the second packet is different from the location of the target ID field in the forwarding tag in the header of the first packet and ii) the size of the target ID field in the forwarding tag in the header of the second packet is different from the size of the target ID field in the forwarding tag in the header of the first packet.

The method further comprises identifying, with the ingress processor based on information in the header of the packet, a packet hash type corresponding to the packet.

The method further comprises obtaining, with the ingress processor based on the packet hash type corresponding to the packet, a hash value for the packet.

Determining the at least one port to which to forward the packet includes selecting, based on the hash value, the at least one port from a link aggregate group (LAG) of ports.

In another embodiment, a network device comprises a plurality of ports configured to receive and to transmit packets; an ingress processor configured to determine a packet type corresponding to a packet received via a port among the plurality of ports, identify, based on the packet type, one or more header fields to be extracted from a header of the packet, the ingress processor being configured to retrieve, from a memory based on the packet type, i) respective indicators of locations of the one or more header fields and ii) respective indicators of sizes of the one or more header fields, and extract, based on i) the respective indicators of the locations retrieved from the memory and ii) the respective identifiers of the sizes retrieved from the memory, the one or more header fields from the header of the packet; and a packet processor configured to process the packet based on the one or more header fields extracted from the header, the packet processor being configured to at least determine at least one port to which to forward the packet.

In other embodiments, the network device comprises one of, or any suitable combination of two or more of, the following features.

The ingress processor is configured to: generate a packet type key corresponding to the packet, and search, based on the packet type key, a content addressable memory to a find an entry matching the packet type key to determine the packet type corresponding to the packet.

The ingress processor is configured to generate the packet type key to include i) initial information obtained from a header of the packet and ii) additional information obtained other than from the header of the packet.

The ingress processor is configured to generate the packet type key to include one or more user defined fields in the header of the packet.

The ingress processor is further configured to: generate a packet type index corresponding to the determined packet type, and access, based on the packet type index, one or more field identifier tables, stored in the memory, to retrieve, from the one or more field identifier tables, the i) respective indicators of locations of the one or more header fields and ii) respective indicators of sizes of the one or more header fields.

The ingress processor is configured to access at least a destination index table that relates packet type indices to identifiers of header fields, the header fields to be included in a destination index to be used for obtaining a destination portmap for forwarding the packet.

The ingress processor is configured to access at least a source index table that relates packet type indices to identifiers of header fields, the header fields to be included in a source index to be used for obtaining a source compliment portmap for masking a source port of the packet.

The ingress processor is further configured to: access, based on the packet type index, a class of service (CoS) table stored in the memory, the CoS table relating packet type indices to class of service attributes corresponding to packets, and retrieve, from the CoS table, one or more class of class of service attributes to be used for egress processing of the packet.

The ingress processor is configured to retrieve, from the memory based on the packet type, i) an indicator of a location of a target ID field in a port extender forwarding tag included the header of the packet and ii) an indicator of a size if the target ID field in the port extender forwarding tag included in the header of the packet.

The packet is a first packet, and the ingress processor is further configured to: determine a packet type corresponding to a second packet received by the network device, and retrieve, from the memory based on the packet type corresponding to the second packet, i) an indicator of a location of a target ID field in a port extender forwarding tag in a header of the second packet and ii) an indicator of a size of the target ID field in the port extender forwarding tag in the header of the second packet, wherein one or both i) the location of the target ID field in the port extender forwarding tag in the header of the second packet is different from the location of the target ID field in the port extender port extender forwarding tag in the header of the first packet and ii) the size of the target ID field in the port extender forwarding tag in the header of the second packet is different from the size of the target ID field in the port extender forwarding tag in the header of the first packet.

The ingress processor is further configured to: identify, based on information in the header of the packet, a packet hash type corresponding to the packet, and obtain, based on the packet hash type corresponding to the packet, a hash value for the packet.

The ingress processor is further configured to select, based on the hash value, the at least one port from a link aggregate group (LAG) of ports.

In yet another embodiment, a method for egress processing packets in a network device includes identifying, with a first stage engine implemented in hardware, a particular set of computer-readable instructions, for a particular packet, the particular set of computer-readable instructions being identified from among a plurality of sets of computer-readable instructions stored in a memory, respective ones of the plurality of sets of computer-readable instructions being for performing different sets of egress processing operations with respect to different packets; and executing, with a second stage processor configured to execute computer-readable instructions stored in the memory, the particular set of computer-readable instructions, identified by the first stage engine, to perform the corresponding set of egress processing with respect to the particular packet.

In other embodiments, the method includes one of, or any suitable combination of two or more of, the following features.

Identifying the particular set of computer-readable instructions comprises identifying the particular set of computer-readable instructions based on one or both of i) a source port at which the particular packet was received by the network device and ii) a target port via which the particular packet is to be transmitted from the network device.

Identifying the particular set of computer-readable instructions includes obtaining an indicator of a memory location at which the particular set of instructions is stored in the memory.

The method further comprises: generating, with the first stage engine, metadata to be used for performing the corresponding set of egress processing operations with respect to the particular packet, the metadata being generated to include at least the indicator of the a memory location at which the particular set of instructions is stored in the memory, and retrieving, with the second stage processor from the memory based on the indicator of the memory location, the particular set of computer-readable instructions to be executed.

Performing the corresponding set of egress processing operations with respect to the particular packet includes inserting a forwarding tag into a header of the particular packet.

Generating the metadata comprises generating the metadata to further include a template populated with header information according to a particular format of the forwarding tag.

Performing the corresponding set of egress processing with respect to the particular packet includes inserting the template into the header of the particular packet.

Modifying the header of the packet includes triggering, with the second stage processor, a hardware accelerator engine to perform a particular processing operation on the header of the packet, wherein the processor would take significantly longer to perform the particular processing operation than the external processing engine.

Engaging the hardware accelerator comprises engaging one of i) a bit operation accelerator engine to shift fields in a header of the packet by a number of bits for insertion of a particular forwarding tag into the header and ii) a byte operation accelerator engine to shift fields in a header of the packet by a number of bytes for insertion of a particular forwarding tag into the header.

The second stage processor comprises a plurality processing nodes configured to perform egress processing with respect to multiple packets in parallel.

The method further comprises distributing egress processing of the particular packet to a respective packet processing node among the plurality of packet processing nodes.

In still another embodiment, a network device comprises a plurality of ports configured to receive and to transmit packets; a memory configured to store a plurality of sets of computer-readable instructions for modifying packet headers, respective ones of the plurality of sets of computer-readable instructions being for performing different sets of egress processing operations with respect to different packets; and an egress processing engine, including a first stage engine implemented in hardware, the first stage engine configured to identify, for a particular packet, a particular set of computer-readable instructions, from among the plurality of sets of computer-readable instructions stored in the memory, for performing, and a second stage processor configured to execute computer-readable instructions, the second stage processor being configured to execute the particular set of computer-readable instructions, identified by the first stage engine, to perform the corresponding set of egress processing operations with respect to the particular packet.

In other embodiments, the network device comprises one of, or any suitable combination of two or more of, the following features.

The first stage engine is configured to identify the particular set of computer-readable instructions based on one or both of i) a source port at which the particular packet was received by the network device and ii) a target port via which the particular packet is to be transmitted from the network device.

The first stage engine is further configured to obtain an indicator of a memory location at which the particular set of instructions is stored in the memory.

The first stage engine is further configured to generate metadata to be used for performing the corresponding set of egress processing operations with respect to the particular packet, the metadata generated to include at least the indicator of the a memory location at which the particular set of instructions is stored in the memory.

The second stage processor is further configured to retrieve, from the memory based on the indicator of the memory location, the particular set of computer-readable instructions to be executed.

The second stage processor is configured to perform the corresponding set of egress processing at least to insert a forwarding tag into a header of the particular packet.

The first stage engine is configured to generate the metadata to further include a template populated with header information according to a particular format of the forwarding tag.

The second stage processor is configured to insert the tag into the header of the particular packet by inserting the template into the header of the particular packet.

The second stage processor is configured to, during execution of the particular set of computer-readable instructions, trigger a hardware accelerator engine to perform a particular processing operation on the header of the packet, wherein the processor would take significantly longer to perform the particular processing operation than the external processing engine.

The second stage processor is configured to engage one of i) a bit operation accelerator engine to shift fields in a header of the packet by a number of bits for insertion of a particular forwarding tag into the header and ii) a byte operation accelerator engine to shift fields in a header of the packet by a number of bytes for insertion of a particular forwarding tag into the header.

The second stage processor comprises a plurality processing nodes configured to perform egress processing with respect to multiple packets in parallel.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer-readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. The one or more processors may be implemented on one or more of i) one or more integrated circuit (IC) devices, ii) one or more application-specific integrated circuits (ASICs), iii) one or more programmable logic devices (PLDs), etc.

When implemented in hardware, the hardware may comprise a plurality of transistors (and other circuit components such as capacitors) arranged and coupled together as circuitry that is configured to perform various acts. The circuitry may be implemented on one or more of i) one or more of discrete components, ii) one or more IC devices, iii) one or more ASICs, iv) one or more PLDs, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing of packets ingressing a network device, the method comprising
receiving a packet at a port of the network device;
performing, with an ingress processor of the network device, ingress processing of the packet, the ingress processing including:
determining a packet type, among a plurality of packet types supported by the network device, corresponding to the packet,
identifying, based on the packet type, one or more header fields to be extracted from a header of the packet, including i) determining one or more locations in a memory using the determined packet type, the memory storing respective information identifying header fields to be extracted from headers of packets corresponding to respective packet types among the plurality of packet types, and ii) retrieving, from the determined one or more locations in the memory a) respective indicators of locations of the one or more header fields to be extracted from the header of the packet and b) respective indicators of sizes of the one or more header fields to be extracted from the header of the packet, and
extracting, based on i) the respective indicators of the locations retrieved from the memory and ii) the respective identifiers of the sizes retrieved from the memory, the one or more header fields from the header of the packet; and
processing, with a packet processor of the network device, the packet based on the one or more header fields extracted from the header, the processing including determining at least one port to which to forward the packet.

2. The method of claim 1, wherein determining the packet type includes:
generating a packet type key corresponding to the packet, and
searching, based on the packet type key, a content addressable memory to a find an entry matching the packet type key.

3. The method of claim 2, wherein generating the packet type key comprises generating the packet type key to include i) initial information obtained from the header of the packet and ii) additional information obtained other than from the header of the packet.

4. The method of claim 2, wherein generating the packet type key includes generating the packet type key to include one or more user defined fields in the header of the packet.

5. The method of claim 1, wherein:
determining the one or more locations in the memory using the determined packet type comprises generating a packet type index corresponding to the determine packet type, and
retrieving, from the determined one or more locations in the memory i) respective indicators of locations of the one or more header fields and ii) respective indicators of sizes of the one or more header fields comprises accessing, using the packet type index, one or more field identifier tables stored in the memory.

6. The method of claim 5, wherein accessing the one or more field identifier tables includes accessing, using the packet type index, a destination index table that relates packet type indices to identifiers of header fields, the header fields to be included in a destination index to be used for obtaining a destination portmap for forwarding the packet.

7. The method of claim 5, wherein accessing the one or more field identifier tables includes accessing, using the packet type index, a source index table that relates packet type indices to identifiers of header fields, the header fields to be included in a source index to be used for obtaining a source compliment portmap for masking a source port of the packet.

8. The method of claim 5, further comprising accessing, using the packet type index, a class of service (CoS) table stored in the memory, the CoS table relating packet type indices to class of service attributes corresponding to the packet.

9. The method of claim 1, wherein:
the network device is a port extender device, and
retrieving, from the determined one or more locations in the memory, i) respective indicators of locations of the one or more header fields and ii) respective indicators of sizes of the one or more header fields includes retrieving, from the determined one or more locations in the memory, a target ID field in a forwarding tag in the header of the packet.

10. The method of claim 9, wherein the packet is a first packet,
the method further comprises
receiving a second packet at the network device,
determining a packet type, among the plurality of packet types supported by the network device, corresponding to the second packet,
determining one or more other locations in the memory using the determined packet type corresponding to the second packet, and
retrieving, from the determined one or more other locations in the memory using the determined packet type corresponding to the second packet, i) an indicator of a location of a target ID field in a forwarding tag in a header of the second packet and ii) an indicator of a size of the target ID field in a forwarding tag in the header of the second packet, wherein one or both i) the location of the target ID field in the forwarding tag in the header of the second packet is different from the location of the target ID field in the forwarding tag in the header of the first packet and ii) the size of the target ID field in the forwarding tag in the header of the second packet is different from the size of the target ID field in the forwarding tag in the header of the first packet.

11. The method of claim 1, further comprising:
identifying, with the ingress processor based on information in the header of the packet, a packet hash type corresponding to the packet; and
obtaining, with the ingress processor based on the packet hash type corresponding to the packet, a hash value for the packet; and
wherein determining the at least one port to which to forward the packet includes selecting, based on the hash value, the at least one port from a link aggregate group (LAG) of ports.

12. A network device, comprising
a plurality of ports configured to receive and to transmit packets;
a memory storing respective information identifying header fields to be extracted from headers of packets corresponding to respective packet types among a plurality of packet types supported by the network device;
an ingress processor coupled to the memory, the ingress processor configured to
determine a packet type, among the plurality of packet types supported by the network device, corresponding to a packet received via a port among the plurality of ports,
identify, based on the packet type, one or more header fields to be extracted from a header of the packet, including i) determining one or more locations in the memory using the determined packet type, and ii) retrieving, from the determined one or more locations in the memory a) respective indicators of locations of the one or more header fields to be extracted from the header of the packet and b) respective indicators of sizes of the one or more header fields to be extracted from the header of the packet, and
extract, based on i) the respective indicators of the locations retrieved from the memory and ii) the respective identifiers of the sizes retrieved from the memory, the one or more header fields from the header of the packet; and
a packet processor configured to process the packet based on the one or more header fields extracted from the header, the packet processor being configured to at least determine at least one port to which to forward the packet.

13. The network device of claim 12, wherein the ingress processor is configured to:
generate a packet type key corresponding to the packet, and
search, based on the packet type key, a content addressable memory to a find an entry matching the packet type key to determine the packet type corresponding to the packet.

14. The network device of claim 13, wherein the ingress processor is configured to generate the packet type key to include i) initial information obtained from the header of the packet and ii) additional information obtained other than from the header of the packet.

15. The network device of claim 13, wherein the ingress processor is configured to generate the packet type key to include one or more user defined fields in the header of the packet.

16. The network device of claim 12, wherein the ingress processor is further configured to:
generate a packet type index corresponding to the determined packet type, and
access, using the packet type index, one or more field identifier tables, stored in the memory, to retrieve, from the one or more field identifier tables, the i) respective indicators of locations of the one or more header fields and ii) respective indicators of sizes of the one or more header fields.

17. The network device of claim 16, wherein the ingress processor is configured to access, using the packet type index, at least a destination index table that relates packet type indices to identifiers of header fields, the header fields to be included in a destination index to be used for obtaining a destination portmap for forwarding the packet.

18. The network device of claim 16, wherein the ingress processor is configured to access, using the packet type index, at least a source index table that relates packet type indices to identifiers of header fields, the header fields to be included in a source index to be used for obtaining a source compliment portmap for masking a source port of the packet.

19. The network device of claim 16, wherein the ingress processor is further configured to:
access, using the packet type index, a class of service (CoS) table stored in the memory, the CoS table relating packet type indices to class of service attributes corresponding to packets, and
retrieve, from the CoS table, one or more class of class of service attributes to be used for egress processing of the packet.

20. The network device of claim 19, wherein the ingress processor is further configured to:
identify, based on information in the header of the packet, a packet hash type corresponding to the packet,
obtain, based on the packet hash type corresponding to the packet, a hash value for the packet, and
select, based on the hash value, the at least one port from a link aggregate group (LAG) of ports.

21. The network device of claim 12, wherein the ingress processor is configured to retrieve, from the determined one or more locations in the memory, i) an indicator of a location of a target ID field in a port extender forwarding tag included in the header of the packet and ii) an indicator of a size if of the target ID field in the port extender forwarding tag included in the header of the packet.

22. The network device of claim 21, wherein
the packet is a first packet, and
the ingress processor is further configured to
determine a packet type, among the plurality of packet types supported by the network device, corresponding to a second packet received by the network device, and
determine one or more other locations in the memory using the determined packet type corresponding to the second packet, and
retrieve, from the determined one or more other locations in the memory using the packet type corresponding to the second packet, i) an indicator of a location of a target ID field in a port extender forwarding tag in a header of the second packet and ii) an indicator of a size of the target ID field in the port extender forwarding tag in the header of the second packet, wherein one or both i) the location of the target ID field in the port extender forwarding tag in the header of the second packet is different from the location of the target ID field in the port extender port extender forwarding tag in the header of the first packet and ii) the size of the target ID field in the port extender forwarding tag in the header of the second packet is different from the size of the target ID field in the port extender forwarding tag in the header of the first packet.

\* \* \* \* \*